US011838955B2

(12) United States Patent
Noh et al.

(10) Patent No.: US 11,838,955 B2
(45) Date of Patent: *Dec. 5, 2023

(54) CHANNEL ACCESS METHOD FOR PERFORMING TRANSMISSION IN UNLICENSED BAND, AND DEVICE USING SAME

(71) Applicant: WILUS INSTITUTE OF STANDARDS AND TECHNOLOGY INC., Gyeonggi-do (KR)

(72) Inventors: Minseok Noh, Seoul (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,194

(22) Filed: May 9, 2022

(65) Prior Publication Data

US 2022/0304050 A1 Sep. 22, 2022

Related U.S. Application Data

(63) Continuation of application No. 17/590,824, filed on Feb. 2, 2022, now Pat. No. 11,503,653, which is a
(Continued)

(30) Foreign Application Priority Data

Aug. 6, 2019 (KR) ........................ 10-2019-0095457

(51) Int. Cl.
*H04W 74/08* (2009.01)
*H04W 72/1263* (2023.01)
*H04W 72/23* (2023.01)

(52) U.S. Cl.
CPC ..... *H04W 74/085* (2013.01); *H04W 72/1263* (2013.01); *H04W 72/23* (2023.01); *H04W 74/0816* (2013.01); *H04W 74/0866* (2013.01)

(58) Field of Classification Search
CPC .......... H04W 74/085; H04W 72/1263; H04W 72/14; H04W 74/0816; H04W 74/0866
See application file for complete search history.

(56) References Cited

U.S. PATENT DOCUMENTS 10,660,127 B2    5/2020  Yang et al.
11,503,653 B2 *  11/2022 Noh ..................... H04W 72/23
(Continued)

FOREIGN PATENT DOCUMENTS

EP         3 407 659        11/2018
KR     10-2018-0120202      11/2018
(Continued)

OTHER PUBLICATIONS

International Search Report for PCT/KR2020/010409 dated Oct. 26, 2020 and its English translation from WIPO (now published as WO 2021/025488).
(Continued)

*Primary Examiner* — Kashif Siddiqui
(74) *Attorney, Agent, or Firm* — Ladas & Parry, LLP

(57) ABSTRACT

A base station of a wireless communication system is disclosed. The base station of wireless communication includes a communication module and a processor. The processor is configured to receive a grant for scheduling a plurality of uplink transmissions from the base station, and when the UE attempts to a first fixed duration-based channel access for a first transmission which is one of the plurality of uplink transmission and fails in the first fixed duration-based channel access, attempt to a second fixed duration-
(Continued)

based channel access for a second transmission which is a transmission following the first transmission.

12 Claims, 18 Drawing Sheets

Related U.S. Application Data continuation of application No. PCT/KR2020/010409, filed on Aug. 6, 2020.

(56) References Cited

U.S. PATENT DOCUMENTS

| | | | |
|---|---|---|---|
| 2017/0353972 A1 | 12/2017 | Babaei et al. | |
| 2017/0359808 A1 | 12/2017 | Dinan | |
| 2019/0268912 A1* | 8/2019 | Myung | H04W 72/23 |
| 2020/0053798 A1* | 2/2020 | Tsai | H04W 74/0833 |
| 2020/0187251 A1* | 6/2020 | Noh | H04L 5/0082 |
| 2020/0221310 A1* | 7/2020 | Babaei | H04W 72/0466 |
| 2021/0007149 A1 | 1/2021 | Li et al. | |
| 2021/0044392 A1* | 2/2021 | Myung | H04L 1/1864 |
| 2021/0392685 A1* | 12/2021 | Myung | H04W 72/1263 |
| 2022/0104199 A1* | 3/2022 | Liu | H04W 52/04 |
| 2022/0104260 A1* | 3/2022 | Wang | H04W 72/20 |

FOREIGN PATENT DOCUMENTS

| | | |
|---|---|---|
| TW | 202038663 | 10/2020 |
| WO | 2017/126935 | 7/2017 |
| WO | 2021/025488 | 2/2021 |

OTHER PUBLICATIONS

Written Opinion of the International Searching Authority for PCT/KR2020/010409 dated Oct. 26, 2020 and its English translation by Google Translate (now published as WO 2021/025488).
Qualcomm Incorporated: "Channel Access Procedures for NR Unlicensed", 3GPP TSG RAN WG1 Meeting #97, R1-1907261, Reno, US, May 13-17, 2019. See pp. 1-18.
Media Tek In.: "Discussion on Channel Access Procedure", 3GPP TSG RAN WG1 #97, R1-1906543, Reno, USA, May 13-17, 2019. See pp. 1-16.
Ericsson: "Channel Access Procedure", 3GPP TSG-RAN WG1 Meeting #97, R1-1907454, Reno, NV, USA, May 13-17, 2019. See pp. 1-7.
Sindhu Verma et al.: "3GPP RAN1 status on NR-Unlicensed", IEEE 802.11-19/0920r0, May 16, 2019. Slides 1-12.
Office Action for U.S. Appl. No. 17/590,824 dated Apr. 15, 2022.
Notice of Allowance dated Jun. 30, 2022 for U.S. Appl. No. 17/590,824.
Extended European Search Report dated Jul. 6, 2022 for European Patent Application No. 20850465.4.
Notice of Allowance dated Nov. 21, 2022 for Japanese Patent Application No. 2022-507670 and its English Translation provided by Applicant's foreign counsel.
Wilus Inc.: "Channel access procedure for NR-unlicensed", 3GPP TSG RAN WG1 #98, R1-1909363, Prague, CZ, Aug. 26-30, 2019, pp. 1-6.
Nokia, Nokia Shanghai Bell: "Feature Lead's Summary on Channel Access Procedures", 3GPP TSG RAN WG1 Meeting #97, R1-1906647, Reno, US, May 13-17, 2019, pp. 1-21.
ZTE, Sanechips: "Discussion on channel access procedure for NR-U", 3GPP TSG RAN WG1 Meeting #97, R1-1905951, Reno, USA, May 13-17, 2019, pp. 1-12.
Notice of Allowance dated Nov. 28, 2022 for Korean Patent Application No. 10-2022-7003827 and its English Translation provided by Applicant's foreign counsel.
Notice of Allowance dated Jan. 9, 2023 for Taiwanese Patent Application No. 109126735 and its English Translation by Google Translate.
Samsung: "Channel access procedures for NR-U", 3GPP TSG-RAN WG1 Meeting #97, R1-1906920, Reno, USA, May 13-17, 2019, pp. 1-12.
Office Action dated Jan. 26, 2023 for European Patent Application No. 20850465.4.
Office Action dated Mar. 9, 2023 for U.S. Appl. No. 17/740,149.
Office Action dated Jun. 29, 2023 for Korean Patent Application No. 10-2022-7036011 and its English Translation provided by Applicant's foreign counsel.
Notice of Allowance dated Jun. 29, 2023 for Korean Patent Application No. 10-2022-7036009 and its English Translation provided by Applicant's foreign counsel.
Notice of Allowance dated Jul. 6, 2023 for U.S. Appl. No. 17/740,149.
Office Action dated Jun. 29, 2023 for European Patent Application No. 20 850 465.4.

\* cited by examiner (a)

(b)

CHANNEL ACCESS METHOD FOR PERFORMING TRANSMISSION IN UNLICENSED BAND, AND DEVICE USING SAME

CROSS-REFERENCE TO RELATED APPLICATIONS

This application is a continuation of U.S. patent application Ser. No. 17/590,824 filed on Feb. 2, 2022, which is a continuation of International Patent Application No. PCT/KR2020/010409 filed on Aug. 6, 2020, which claims the priority to Korean Patent Application No. 10-2019-0095457 filed in the Korean Intellectual Property Office on Aug. 6, 2019, the entire contents of which are incorporated herein by reference.

TECHNICAL FIELD

The present invention relates to a wireless communication system. Specifically, the present invention relates to a channel access method and a device using the same in a wireless communication system operating in an unlicensed band.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band, 6 GHz band, 52.6 GHz or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels with other wireless communication devices is to be conducted in advance. That is, it is required to develop a robust coexistence mechanism (RCM) such that devices using LTE and NR technologies in the unlicensed band do not affect the existing devices for unlicensed bands.

DISCLOSURE

Technical Problem

An object of an embodiment of the present invention is to provide a channel access method and a device using the same for performing transmission in a wireless communication system operating in an unlicensed band.

Technical Solution

According to an embodiment of the present invention, a user equipment (UE) wirelessly communicating with a base station in an unlicensed band includes a communication module and a processor controlling the communication module. The processor may be configured to receive a grant for scheduling a plurality of uplink transmissions from the base station, and when the UE attempts a first fixed duration-based channel access for a first transmission which is one of the plurality of uplink transmissions and fails in the first fixed duration-based channel access, may be configured to attempt a second fixed duration-based channel access for a second transmission which is a transmission following the first transmission. The first fixed duration-based channel access is a channel access in which, when a channel is sensed to be idle within a first fixed duration, the UE performing the first fixed duration-based channel access is allowed to perform a transmission immediately after the first fixed duration. The second fixed duration-based channel access is a channel access in which, when the channel is sensed to be idle within a second fixed duration, the UE performing the second fixed duration-based channel access is allowed to perform a transmission immediately after the second fixed duration.

The first fixed duration may be shorter than the second fixed duration.

The first fixed duration may be 16 µs, and the second fixed duration may be 25 µs.

The grant may indicate a fixed duration-based channel access as a channel access type, and indicate a channel access priority used to access a channel in which the plurality of uplink transmissions are performed.

The grant may indicate the first fixed duration-based channel access as the channel access type.

The grant may include one or more grants for scheduling the plurality of uplink transmissions, and the plurality of uplink transmissions may be contiguous without a gap in time.

According to an embodiment of the present invention, a base station wirelessly communicating with a UE in an unlicensed band includes a communication module and a processor controlling the communication module. The processor may be configured to perform a transmission to the UE immediately after a gap between a transmission of the UE and the transmission to the UE without sensing within a maximum channel occupancy time in a channel in which the transmission of the UE is performed, when a duration of the transmission of the UE is less than the maximum channel occupancy time and the gap is not greater than a first fixed duration. In this case, the first fixed duration is 16 µs.

The processor may be configured to perform the transmission to the UE immediately after the gap between the transmission of the UE and the transmission to the UE without sensing within a predetermined duration when the gap is not greater than the first fixed duration, and the predetermined duration may be a constraint applied to the transmission of the base station separately from the maximum channel occupancy time.

The processor may be configured to attempt a first fixed duration-based channel access in a channel in which the transmission of the UE is performed when the gap between the transmission of the UE and the transmission to the UE is equal to the first fixed duration. The first fixed duration-based channel access may be a channel access in which, when the channel is sensed to be idle within a first fixed duration, the base station performing the first fixed duration-based channel access is allowed to perform an transmission immediately after the first fixed duration.

The processor may be configured to attempt the second fixed duration-based channel access in a channel in which the transmission of the UE is performed when the gap between the transmission of the UE and the transmission to the UE is not greater than the second fixed duration. The second fixed duration-based channel access may be a channel access in which, when the channel is sensed to be idle during a second fixed duration, the base station performing the first fixed duration-based channel access is allowed to perform a transmission immediately after the second fixed duration. In this case, the second fixed duration is 25 µs.

Channel occupancy including the transmission of the UE and the transmission of the base station to the UE may be initiated by the base station.

Channel occupancy including the transmission of the UE and the transmission of the base station to the UE may be initiated by the UE.

According to an embodiment of the present invention, a method for operating a UE wirelessly communicating with a base station in the unlicensed band may include: receiving a grant for scheduling a plurality of uplink transmissions from the base station; and when the UE attempts a first fixed duration-based channel access for a first transmission which is one of the plurality of uplink transmissions and fails in the first fixed duration-based channel access, attempting a second fixed duration-based channel access for a second transmission which is a transmission following the first transmission. In this case, the first fixed duration-based channel access may be a channel access in which, when the channel is sensed to be idle within a first fixed duration, the UE performing the first fixed duration-based channel access is allowed to perform a transmission immediately after the first fixed duration, and the second fixed duration-based channel access may be a channel access in which, when the channel is sensed to be idle during a second fixed duration, the UE performing the second fixed duration-based channel access is allowed to perform a transmission immediately after the second fixed duration.

The first fixed duration may be shorter than the second fixed duration.

The first fixed duration may be 16 µs, and the second fixed duration may be 25 µs.

The grant may indicate a fixed duration-based channel access as a channel access type, and may indicate a channel access priority used to access a channel in which the plurality of uplink transmissions are performed.

The grant may indicate the first fixed duration-based channel access as the channel access type.

The grant may include one or more grants for scheduling the plurality of uplink transmissions, and the plurality of uplink transmissions may continue without a gap in time.

According to an embodiment of the present invention, a method for operating a base station wirelessly communicating with a UE in an unlicensed band includes performing a transmission to the UE immediately after a gap between a transmission of the UE and the transmission to the UE without sensing within a maximum channel occupancy time in a channel in which transmission of the UE is performed, when a duration of the transmission of the UE is less than the maximum channel occupancy time and the gap is not greater than a first fixed duration. In this case, the first fixed duration is 16 µs.

The method may further include performing the transmission to the UE immediately after the gap between the transmission of the UE and the transmission to the UE without sensing within a predetermined duration when the gap is not greater than the first fixed duration. In this case, the predetermined duration may be a constraint applied to the transmission of the base station separately from the maximum channel occupancy time.

The method may further include attempting the first fixed duration-based channel access in a channel in which the transmission of the UE is performed when the gap between the transmission of the UE and the transmission to the UE is equal to the first fixed duration. In this case, the first fixed duration-based channel access may be a channel access in which, when the channel is sensed to be idle within a first fixed duration, the base station performing the first fixed duration-based channel access is allowed to perform a transmission immediately after the first fixed duration.

The method may further include attempting the second fixed duration-based channel access in a channel in which the transmission of the UE is performed when the gap between the transmission of the UE and the transmission to the UE is not greater than the second fixed duration. In this case, the second fixed duration-based channel access may be a channel access in which, when the channel is sensed to be idle during a second fixed duration, the base station performing the second fixed duration-based channel access is allowed to perform a transmission immediately after the second fixed duration. Furthermore, the second fixed duration may be 25 µs.

Channel occupancy including the transmission of the UE and the transmission of the base station to the UE may be initiated by the base station.

Channel occupancy including the transmission of the UE and the transmission of the base station to the UE may be initiated by the UE.

Advantageous Effects

An embodiment of the present invention provides a channel access method and a device using the same for performing transmission in a wireless communication system operating in an unlicensed band.

The effect to be achieved by the present invention is not limited to the above-mentioned effects, and other effects not mentioned will be clearly understood by those of ordinary skill in the art from the following description.

MODE FOR CARRYING OUT THE INVENTION

Figure 1:
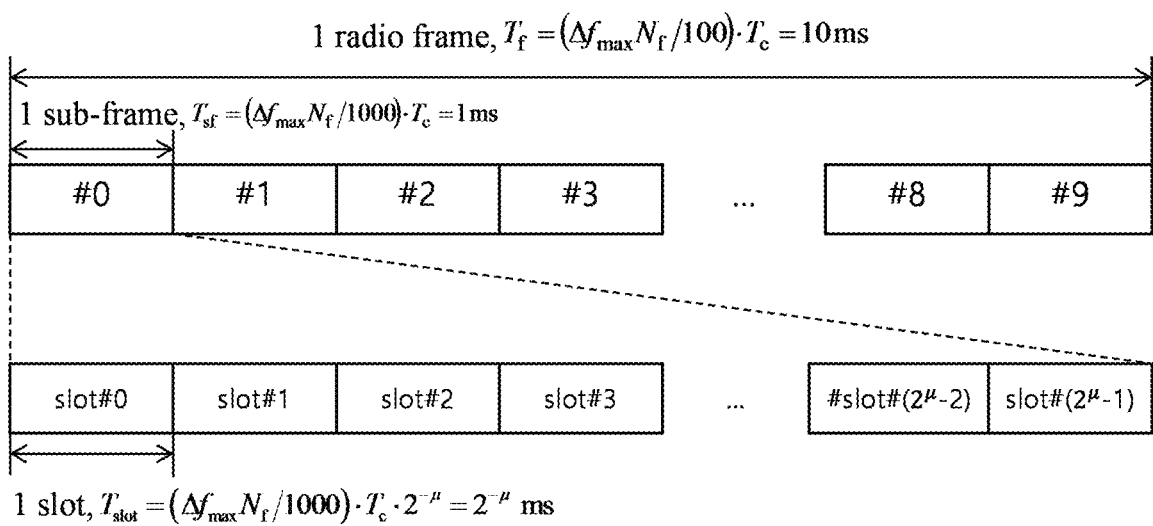
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100 * T_c$). In addition, the wireless frame includes 10 subframes (SFs) having equal sizes. Herein, $\Delta f_{max} = 480 * 10^3$ Hz, $N_f = 4096$, $T_c = 1/(\Delta f_{ref} * N_{f,ref})$, $\Delta f_{ref} = 15 * 10^3$ Hz, and $N_{f,ref} = 2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15 * 2^\mu$ kHz, and µ can have a value of $\mu = 0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu - 1$ may be respectively allocated to $2^\mu$ slots within one wireless frame. In addition, numbers from 0 to $10 * 2^\mu - 1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
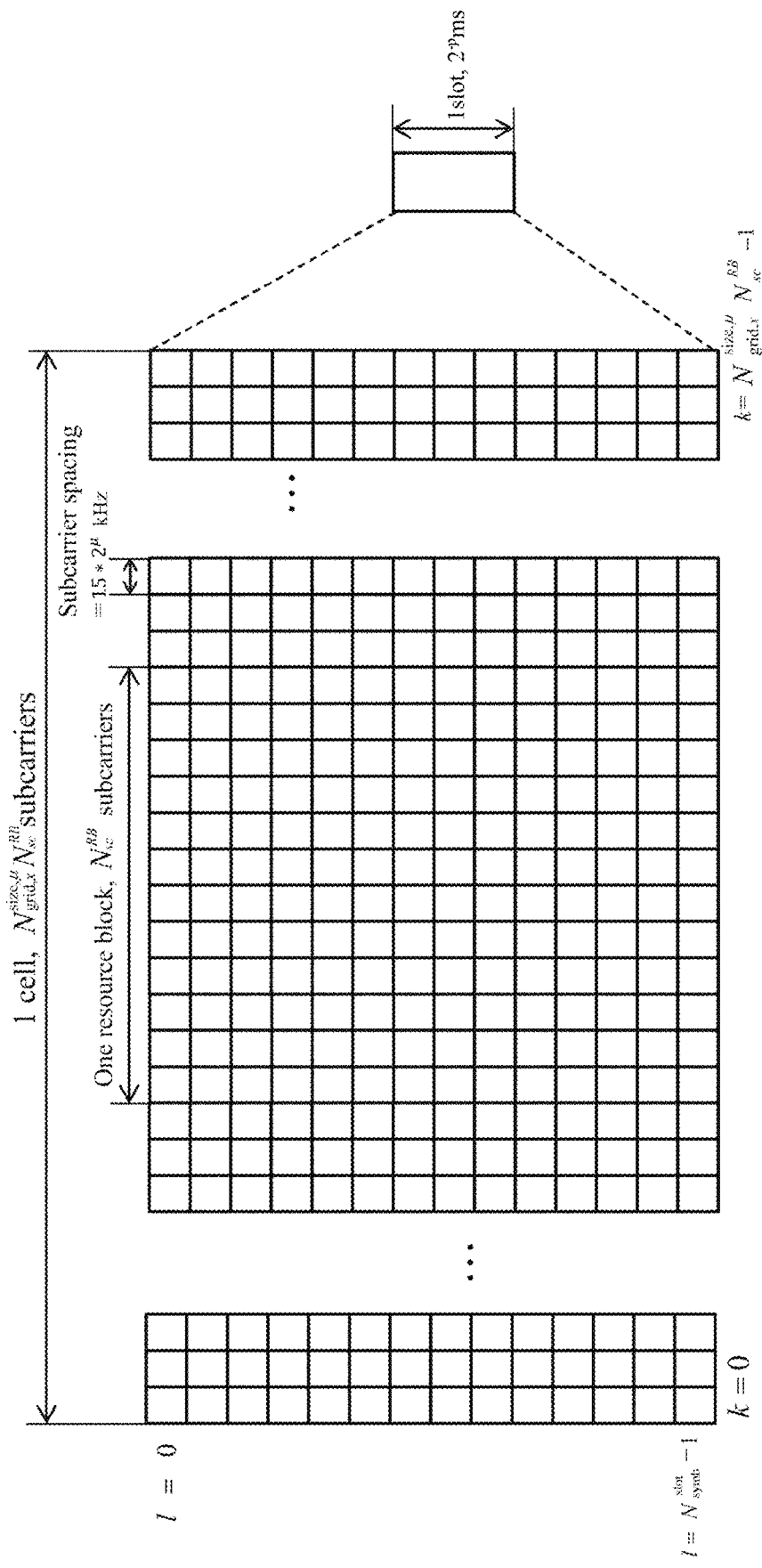
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to as simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent µ (x is DL or UL), and $N^{slot}_{symb}$ represents the number of OFDM symbols in a slot. $N^{RB}_{sc}$ is the number of subcarriers constituting one RB and $N^{RB}_{sc} = 12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc} - 1$ the frequency domain, and 1 may be an index assigned from 0 to $N^{slot}_{symb} - 1$ the time domain.

In order for the UE to receive a signal from the base station or to transmit a time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| Index | \multicolumn{14}{c|}{Symbol number in a slot} | Index | \multicolumn{14}{c|}{Symbol number in a slot} |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | X | U | U | U |
| 4 | D | D | D | D | D | D | D | D | D | D | D | D | X | X | 32 | D | D | D | D | D | D | D | D | D | X | U | U | U | U |
| 5 | D | D | D | D | D | D | D | D | D | D | D | X | X | X | 33 | D | D | D | D | D | D | D | D | X | X | U | U | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | X | U | U | U | U | U | U | U | U | U | U | U |
| 10 | X | U | U | U | U | U | U | U | U | U | U | U | U | U | 38 | D | D | X | X | U | U | U | U | U | U | U | U | U | U |
| 11 | X | X | U | U | U | U | U | U | U | U | U | U | U | U | 39 | D | D | D | X | X | U | U | U | U | U | U | U | U | U |
| 12 | X | X | X | U | U | U | U | U | U | U | U | U | U | U | 40 | D | X | X | X | U | U | U | U | U | U | U | U | U | U |
| 13 | X | X | X | X | U | U | U | U | U | U | U | U | U | U | 41 | D | D | X | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | X | X | X | X | U | U | U |
| 16 | D | X | X | X | X | X | X | X | X | X | X | X | X | X | 44 | D | D | D | D | D | X | X | X | X | X | X | U | U | U |
| 17 | D | D | X | X | X | X | X | X | X | X | X | X | X | X | 45 | D | D | D | D | D | D | X | U | U | U | U | U | U | U |
| 18 | D | D | D | X | X | X | X | X | X | X | X | X | X | X | 46 | D | D | D | D | X | U | D | D | D | D | D | D | X | U |
| 19 | D | X | X | X | X | X | X | X | X | X | X | X | X | U | 47 | D | D | X | U | U | U | D | D | X | U | U | U | U | U |
| 20 | D | D | X | X | X | X | X | X | X | X | X | X | X | U | 48 | D | X | U | U | U | U | D | X | U | U | U | U | U | U |
| 21 | D | D | D | X | X | X | X | X | X | X | X | X | X | U | 49 | D | D | D | X | X | U | D | D | D | X | X | U | U | U |
| 22 | D | X | X | X | X | X | X | X | X | X | X | X | U | U | 50 | D | D | X | X | U | U | D | D | X | X | U | U | U | U |
| 23 | D | D | X | X | X | X | X | X | X | X | X | X | U | U | 51 | D | X | X | U | U | U | D | X | X | U | U | U | U | U |

TABLE 1-continued

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 | Index | 0 | 1 | 2 | 3 | 4 | 5 | 6 | 7 | 8 | 9 | 10 | 11 | 12 | 13 |
| 24 | D | D | D | X | X | X | X | X | X | X | X | X | U | U | 52 | D | X | X | X | X | X | U | D | X | X | X | X | X | U |
| 25 | D | X | X | X | X | X | X | X | X | X | X | U | U | U | 53 | D | D | X | X | X | X | U | D | X | X | X | X | X | U |
| 26 | D | D | X | X | X | X | X | X | X | X | X | U | U | U | 54 | X | X | X | X | X | X | X | D | D | D | D | D | D | D |
| 27 | D | D | D | X | X | X | X | X | X | X | X | U | U | U | 55 | D | D | X | X | X | U | U | U | D | D | D | D | D | D |
| 56~255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
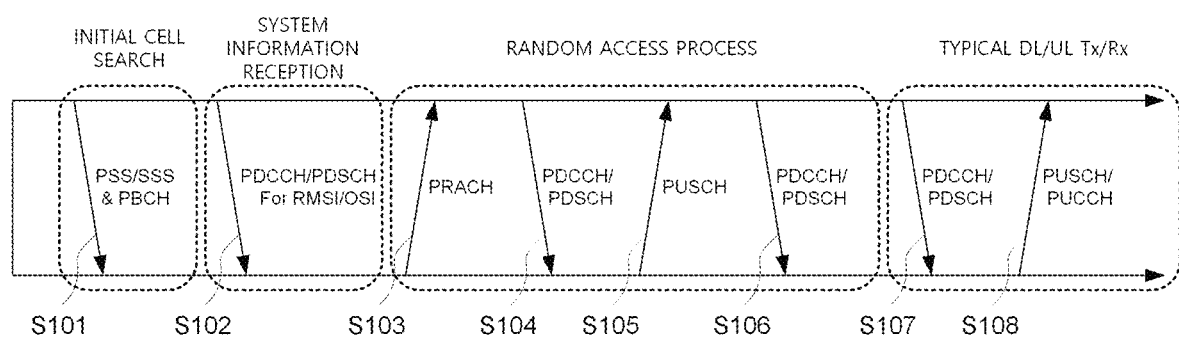
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
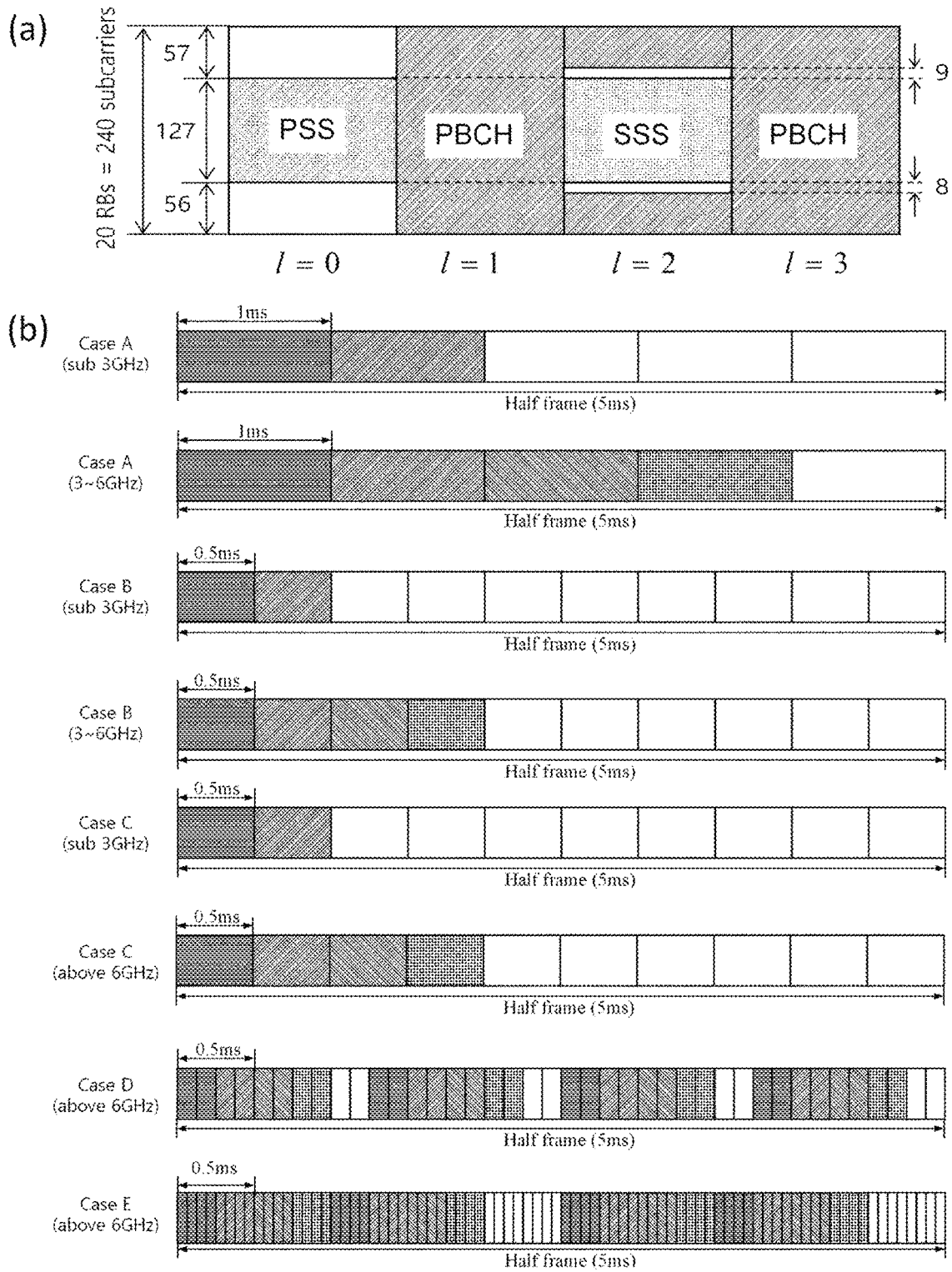
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N_{ID}^{(2)})\bmod 127$$

$$0 \leq n < 127$$

Here, $x(i+7)=(x(i+4)+x(i))\bmod 2$ and is given as $$[x(6)x(5)x(4)x(3)x(2)x(1)x(0)]=[1110110]$$

Further, the sequence $d_{SSS}(n)$ of the SSS is as follows.

$$d_{SSS}(n) = [1 - 2x_0((n + m_0)\bmod 127)][1 - 2x_1((n + m_1)\bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

Here, $$x_0(i+7)=(x_0(i+4)+x_0(i))\bmod 2$$

$$x_1(i+7)=(x_1(i+1)+x_1(i))\bmod 2$$

and is given as $$[x_0(6)x_0(5)x_0(4)x_0(3)x_0(2)x_0(1)x_0(0)]=[0000001]$$

$$[x_1(6)x_1(5)x_1(4)x_1(3)x_1(2)x_1(0)]=[0000001]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
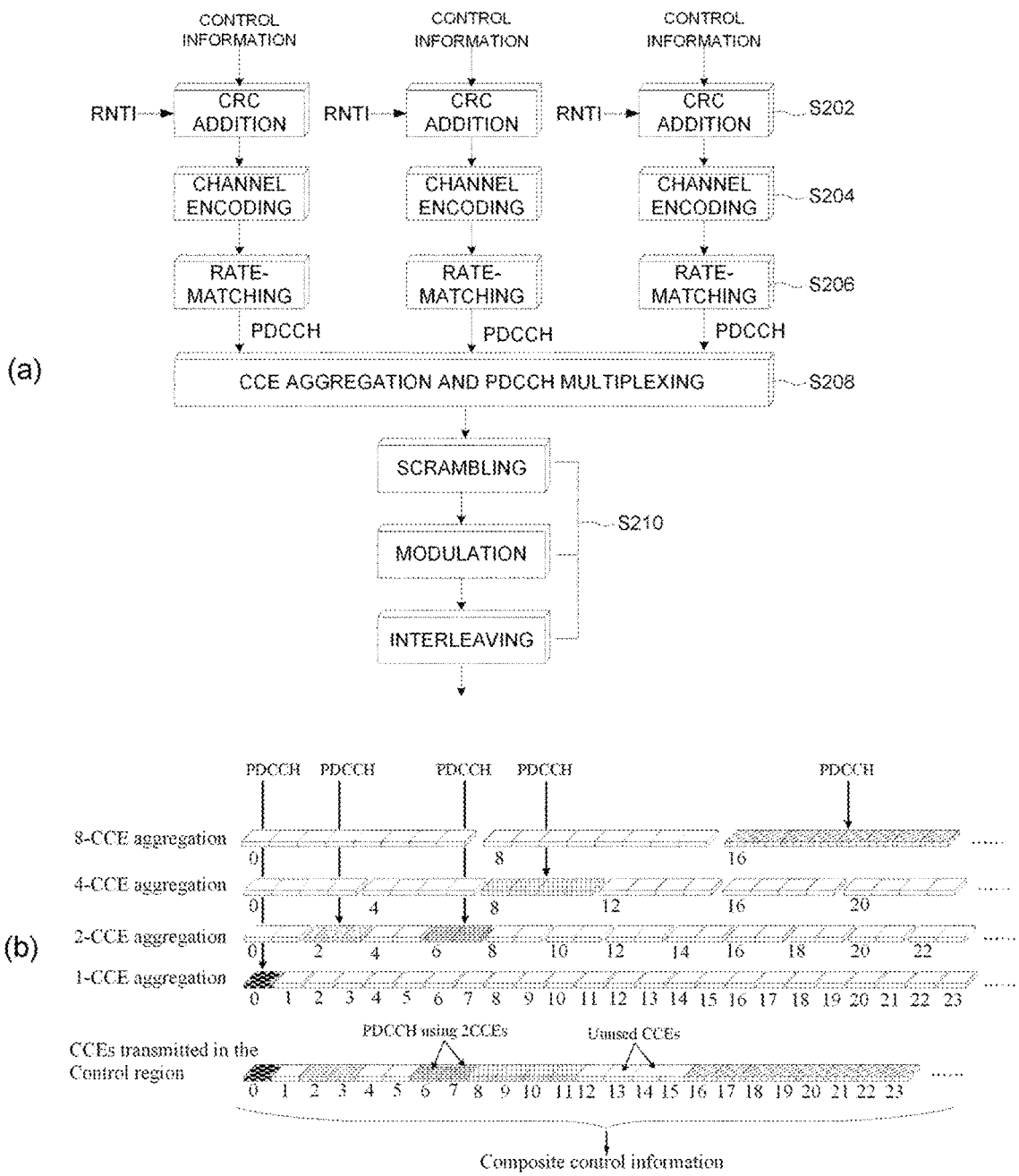
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
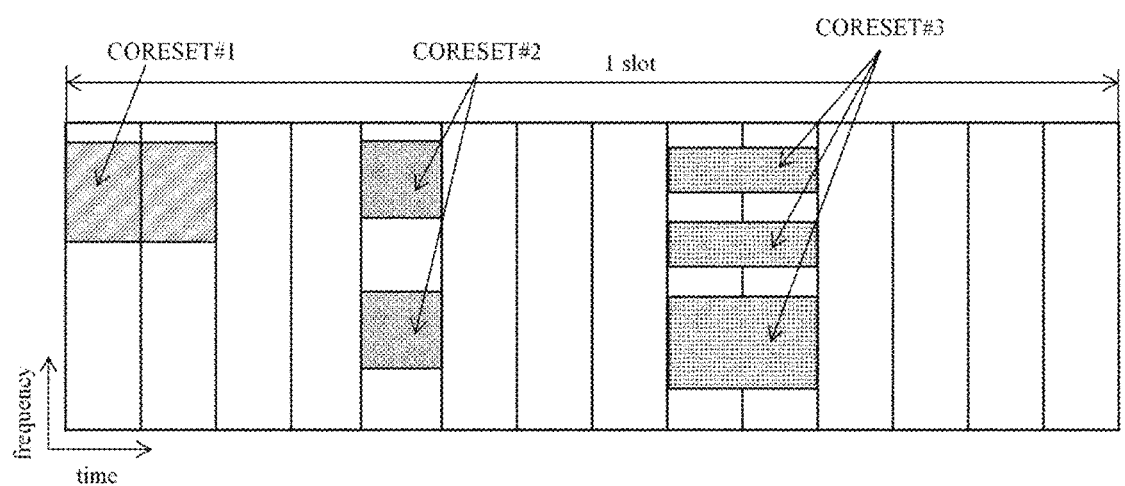
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted.

In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
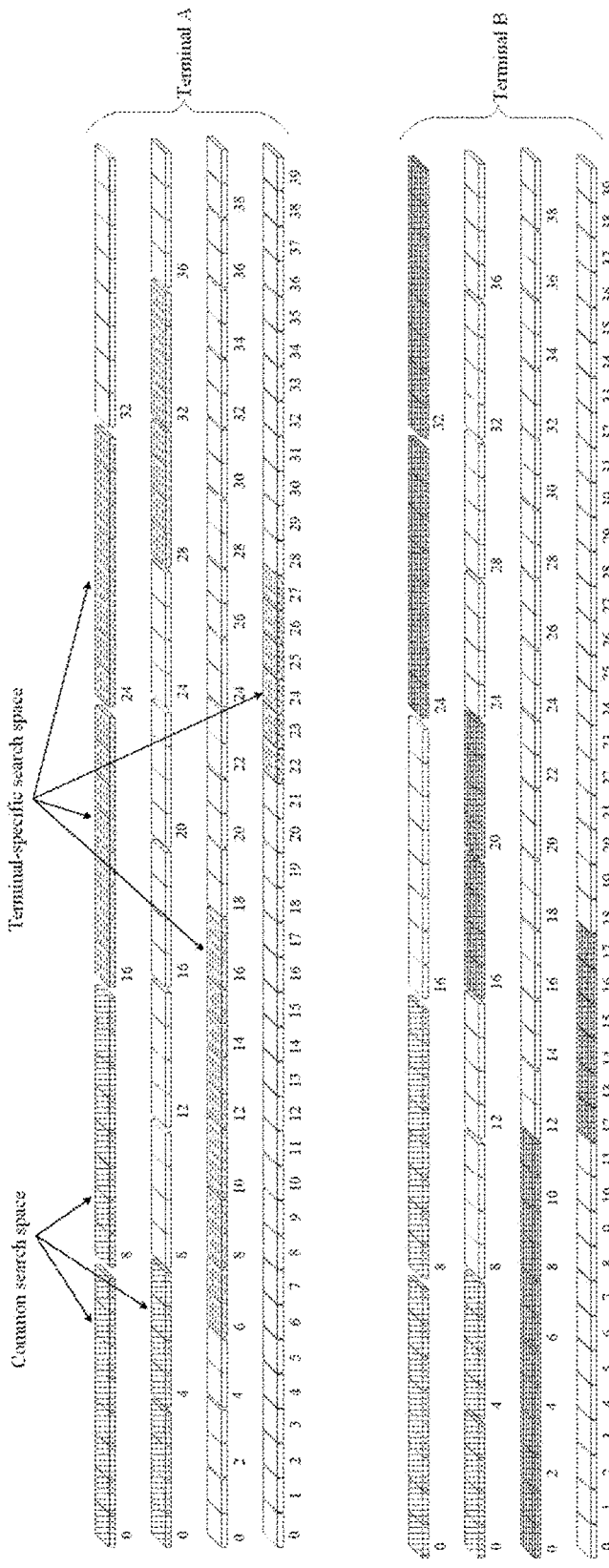
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARD). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).
  Scheduling Request (SR): Information used for requesting a UL UL-SCH resource.
  HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.
  Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$>2. Through this, the UE may obtain a frequency diversity gain. More specifically, $M_{bit}$ UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
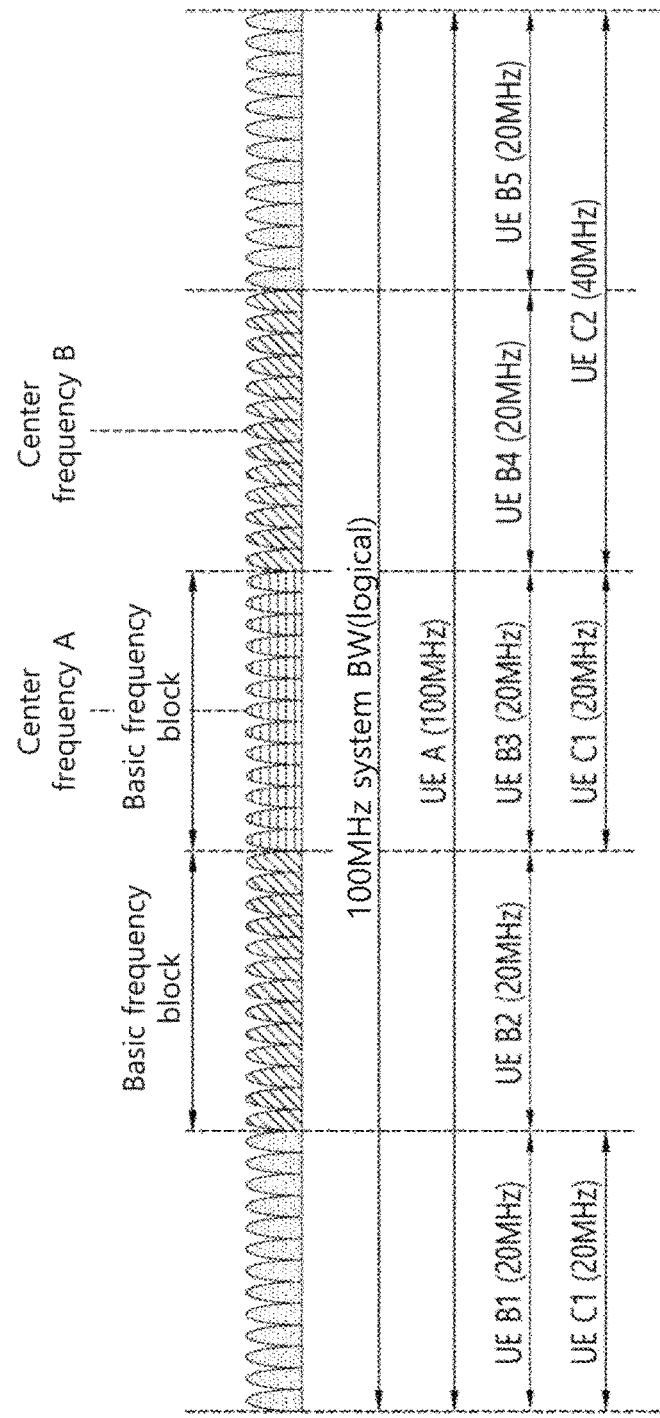
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
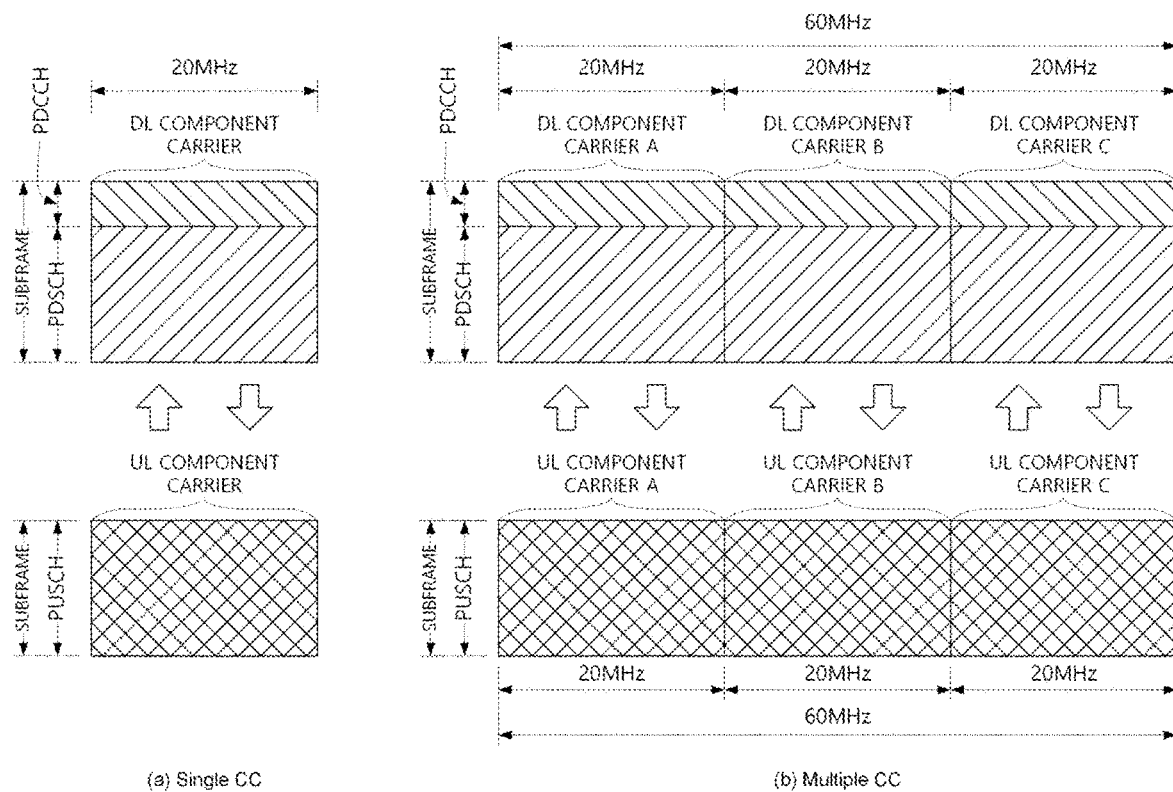
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
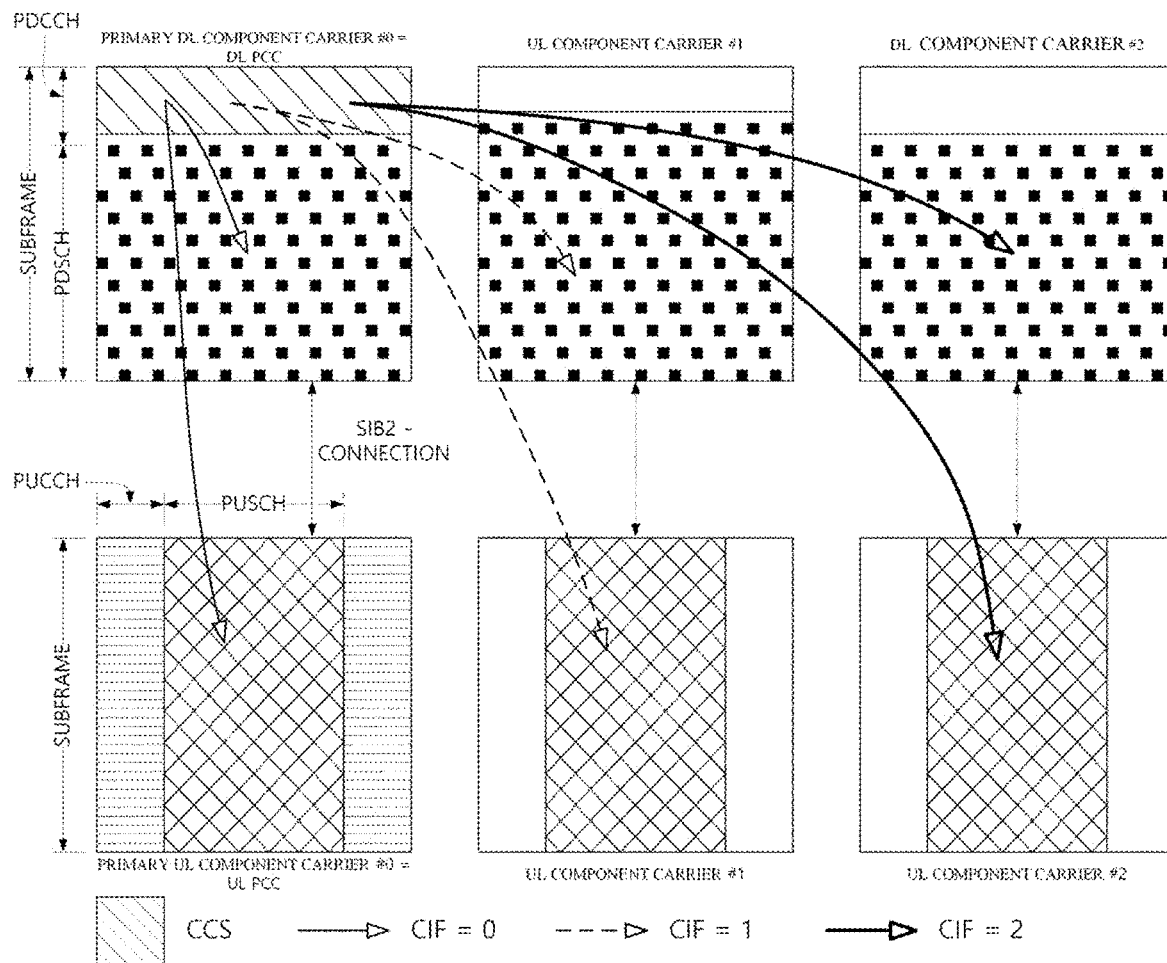
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
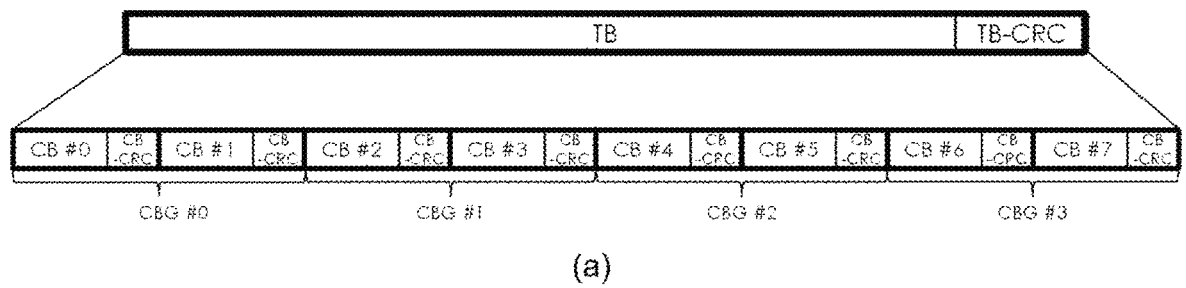
FIG. 11 illustrates a code block group (CBG) configuration and time frequency resource mapping thereof according to an embodiment of the present invention.
Figure 11:
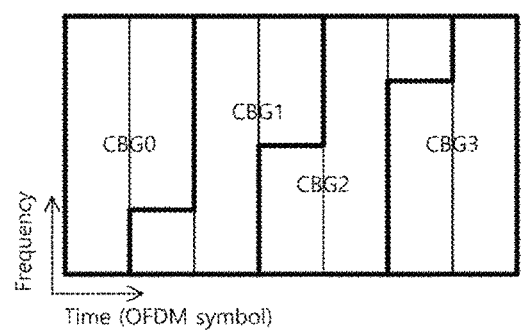

FIG. 11 illustrates a code block group (CBG) configuration and time frequency resource mapping thereof according to an embodiment of the present invention. More specifically, FIG. 11(a) illustrates an embodiment of a CBG configuration included in one transport block (TB), and FIG. 11(b) illustrates a time-frequency resource mapping of the CBG configuration.

A channel code defines the maximum supported length. For example, the maximum supported length of the turbo code used in 3GPP LTE (-A) is 6144 bits. However, the length of a transport block (TB) transmitted on the PDSCH may be longer than 6144 bits. If the length of the TB is longer than the maximum supported length, the TB may be divided into code blocks (CBs) having a maximum length of 6144 bits. Each CB is a unit in which channel coding is performed. Additionally, for efficient retransmission, several CBs may be grouped to configure one CBG. The UE and the base station require information on how the CBG is configured.

The CBG and the CB within the TB may be configured according to various embodiments. According to an embodiment, the number of available CBGs may be determined as a fixed value, or may be configured with RRC configuration information between the base station and the UE. In this case, the number of CBs is determined with the length of the TB, and the CBG may be configured depending on the information on the determined number. According to another embodiment, the number of CBs to be included in one CBG may be determined as a fixed value, or may be configured with RRC configuration information between the base station and the UE. In this case, if the number of CBs is determined with the length of the TB, the number of the CBGs may be configured depending on the information on the number of CBs per CBG.

Referring to the embodiment of FIG. 11(a), one TB may be divided into eight CBs. Eight CBs may be grouped into four CBGs again. The mapping relationship between the CBs and the CBGs (or CBG configuration) may be configured as static between the base station and the UE, or may be established as semi-static with RRC configuration information. According to another embodiment, the mapping relationship may be configured through dynamic signaling. When the UE receives the PDCCH transmitted by the base station, the UE may directly or indirectly identify the mapping relationship between the CB and the CBG (or CBG configuration) through explicit information and/or implicit information. One CBG may include only one CB, or may include all CBs constituting one TB. For reference, the techniques presented in the embodiments of the present invention may be applied regardless of the configuration of the CB and the CBG.

Referring to FIG. 11(b), CBGs constituting one TB are mapped to time-frequency resources for which the PDSCH is scheduled. According to an embodiment, each of the CBGs may be allocated first on the frequency axis and then extended on the time axis. When a PDSCH consisting of one TB including four CBGs is allocated to seven OFDM symbols, CBG0 may be transmitted over the first and second OFDM symbols, CBG1 may be transmitted over the second, third, and fourth OFDM symbols, CBG2 may be transmitted over the fourth, fifth, and sixth OFDM symbols, and CBG3 may be transmitted over the sixth and seventh OFDM symbols. The time-frequency mapping relationship allocated with the CBG and PDSCH may be determined between the base station and the UE. However, the mapping relationship illustrated in FIG. 11(b) is an embodiment for describing the present invention, and the techniques presented in the embodiment of the present invention may be applied regardless of the time-frequency mapping relationship of the CBG.

Figure 12:
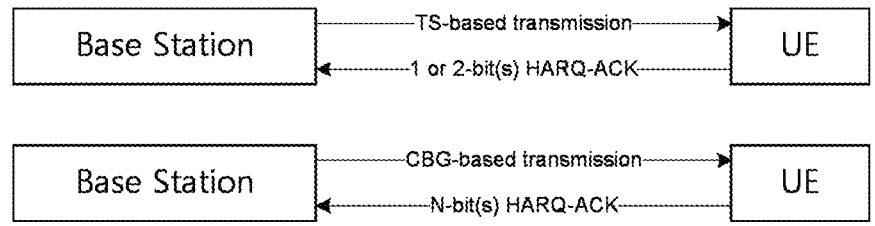
FIG. 12 illustrates a procedure in which a base station performs a TB-based transmission or a CBG-based transmission, and a UE transmits a HARQ-ACK in response thereto, according to an embodiment of the present invention.

FIG. 12 illustrates a procedure in which a base station performs a TB-based transmission or a CBG-based transmission, and a UE transmits a HARQ-ACK in response thereto. Referring to FIG. 12, the base station may configure a transmission scheme suitable for the UE of the TB-based transmission and the CBG-based transmission. The UE may transmit HARQ-ACK information bit(s) according to the transmission scheme configured by the base station through the PUCCH or PUSCH. The base station may configure the PDCCH to schedule the PDSCH to be transmitted to the UE. The PDCCH may schedule the TB-based transmission and/or the CBG-based transmission. For example, one TB or two TBs may be scheduled on the PDCCH. If one TB is scheduled, the UE has to feedback 1-bit HARQ-ACK. If two TBs are scheduled, a 2-bit HARQ-ACK has to be fed back for each of the two TBs. In order to eliminate ambiguity between the base station and the UE, a predetermined order may exist between each information bit of the 2-bit HARQ-ACK and two TBs. For reference, when the MIMO transmission rank or layer is low, one TB may be transmitted on one PDSCH, and when the MIMO transmission rank or layer is high, two TBs may be transmitted on one PDSCH.

The UE may transmit a 1-bit TB-based HARQ-ACK per one TB to inform the base station whether or not the reception of each TB is successful. In order to generate a HARQ-ACK for one TB, the UE may check the reception error of the TB through a TB-CRC. When the TB-CRC for the TB is successfully checked, the UE generates an ACK for the HARQ-ACK of the TB. However, if a TB-CRC error for the TB occurs, the UE generates a NACK for the HARQ-ACK of the TB. The UE transmits TB-based HARQ-ACK(s) generated as described above to the base station. The base station retransmits the TB of response with a NACK, among the TB-based HARQ-ACK(s) received from the UE.

In addition, the UE may transmit a 1-bit CBG-based HARQ-ACK per one CBG to inform the base station whether or not the reception of each CBG is successful. In order to generate a HARQ-ACK for one CBG, the UE may decode all CBs included in the CBG and check the reception error of each CB through the CB-CRC. When the UE successfully receives all CBs constituting one CBG (that is, when all CB-CRCs are successfully checked), the UE generates an ACK for the HARQ-ACK of the CBG. However, when the UE does not successfully receive at least one of the CBs constituting one CBG (that is, when at least one CB-CRC error occurs), the UE generates a NACK for the HARQ-ACK of the CBG. The UE transmits the CBG-based HARQ-ACK(s) generated as described above to the base station. The base station retransmits the CBG of response with a NACK, among the CBG-based HARQ-ACK(s) received from the UB. According to an embodiment, the CB configuration of the retransmitted CBG may be the same as the CB configuration of the previously transmitted CBG. The length of the CBG-based HARQ-ACK information bit(s) transmitted by the UE to the base station may be determined based on the number of CBGs transmitted through the PDSCH or the maximum number of CBGs configured with RRC signals.

On the other hand, even when the UE successfully receives all the CBGs included in the TB, a TB-CRC error for the TB may occur. In this case, the UE may perform flipping of the CBG-based HARQ-ACK in order to request retransmission for the TB. That is, even though all CBGs included in the TB are successfully received, the UE may generate all of the CBG-based HARQ-ACK information bits as NACKs. Upon receiving the CBG-based HARQ-ACK feedback in which all HARQ-ACK information bits are NACKs, the base station retransmits all CBGs of the TB.

According to an embodiment of the present invention, CBG-based HARQ-ACK feedback may be used for the successful transmission of the TB. The base station may indicate the UE to transmit a CBG-based HARQ-ACK. In this case, a retransmission technique according to the CBG-based HARQ-ACK may be used. The CBG-based HARQ-ACK may be transmitted through a PUCCH. In addition, when the UCI is configured to be transmitted through the PUSCH, the CBG-based HARQ-ACK may be transmitted through the PUSCH. In the PUCCH, the configuration of the HARQ-ACK resource may be configured through an RRC signal. In addition, an actually transmitted HARQ-ACK resource may be indicated through a PDCCH scheduling a PDSCH transmitted based on the CBG. The UE may transmit HARQ-ACK(s) for whether or not the reception of transmitted CBGs is transmitted, through one PUCCH resource indicated through the PDCCH among PUCCH resources configured with RRC.

The base station may identify whether the UE has successfully received the CBG(s) transmitted to the UE through CBG-based HARQ-ACK feedback of the UE. That is, through the HARQ-ACK for each CBG received from the UE, the base station may recognize the CBG(s) that the UE has successfully received and the CBG(s) that the UE has failed to receive. The base station may perform CBG retransmission based on the received CBG-based HARQ-ACK. More specifically, the base station may bundle and retransmit only the CBG(s) of HARQ-ACKs of response with failure, in one TB. In this case, the CBG(s) for which the HARQ-ACKs is responded with successful reception are excluded from retransmission. The base station may schedule the retransmitted CBG(s) as one PDSCH and transmit it to the UE.

<Communication Method in Unlicensed Band>

Figure 13:
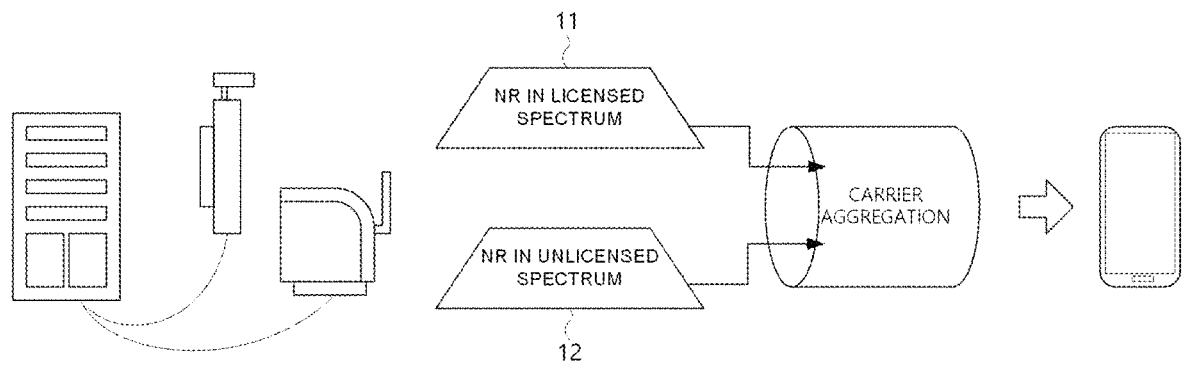
FIG. 13 illustrates a New Radio-Unlicensed (NR-U) service environment.

FIG. 13 illustrates a New Radio-Unlicensed (NR-U) service environment.

Referring to FIG. 13, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 21 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

Figure 14:
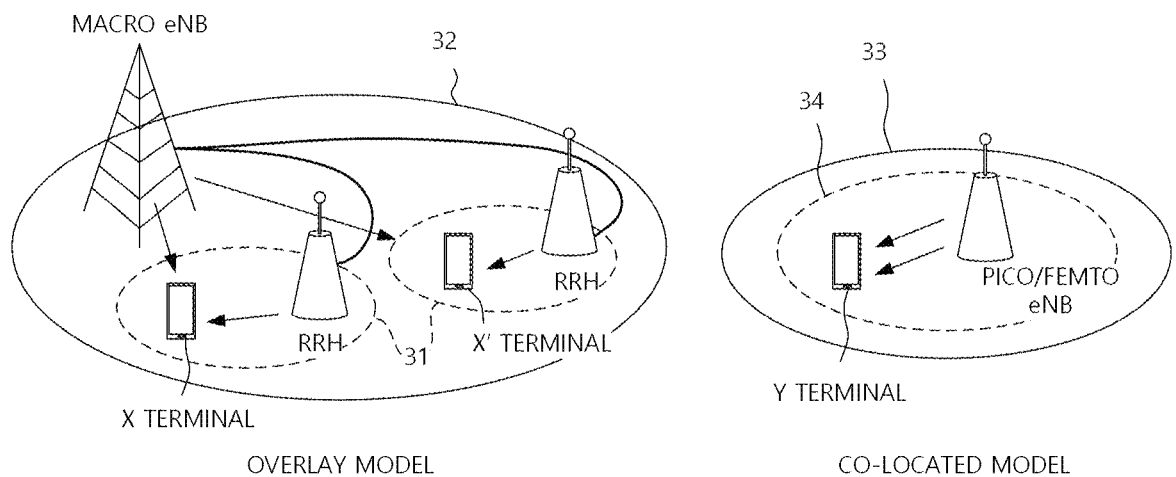
FIG. 14 illustrates an embodiment of an arrangement scenario of a UE and a base station in an NR-U service environment.

FIG. 14 illustrates a deployment scenario of a user equipment and a base station in an NR-U service environment. A frequency band targeted by the NR-U service environment has short radio communication range due to the high frequency characteristics. Considering this, the deployment scenario of the user equipment and the base station may be an overlay model or a co-located model in an environment in which coexist the existing NR-L service and NR-U service.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the NR-U service as an auxiliary downlink channel of the NR-L service through the carrier aggregation.

In the co-located model, a pico/femto base station may perform the wireless communication with a Y UE by using both the licensed carrier and the unlicensed carrier. However, it may be limited that the pico/femto base station uses both the NR-L service and the NR-U service to downlink transmission. A coverage (33) of the NR-L service and a coverage (34) of the NR-U service may be different according to the frequency band, transmission power, and the like.

When NR communication is performed in the unlicensed band, conventional equipments (e.g., wireless LAN (Wi-Fi) equipments) which perform communication in the corresponding unlicensed band may not demodulate an NR-U message or data. Therefore, conventional equipments determine the NR-U message or data as a kind of energy to perform an interference avoidance operation by an energy detection technique. That is, when energy corresponding to the NR-U message or data is lower than −62 dBm or certain energy detection (ED) threshold value, the wireless LAN equipments may perform communication by disregarding the corresponding message or data. As a result, that user equipment which performs the NR communication in the unlicensed band may be frequently interfered by the wireless LAN equipments.

Therefore, a specific frequency band needs to be allocated or reserved for a specific time in order to effectively implement an NR-U technology/service. However, since peripheral equipments which perform communication through the unlicensed band attempt access based on the energy detection technique, there is a problem in that an efficient NR-U service is difficult. Therefore, a research into a coexistence scheme with the conventional unlicensed band device and a scheme for efficiently sharing a radio channel needs to be preferentially made in order to settle the NR-U technology. That is, a robust coexistence mechanism in which the NR-U device does not influence the conventional unlicensed band device needs to be developed.

Figure 15:
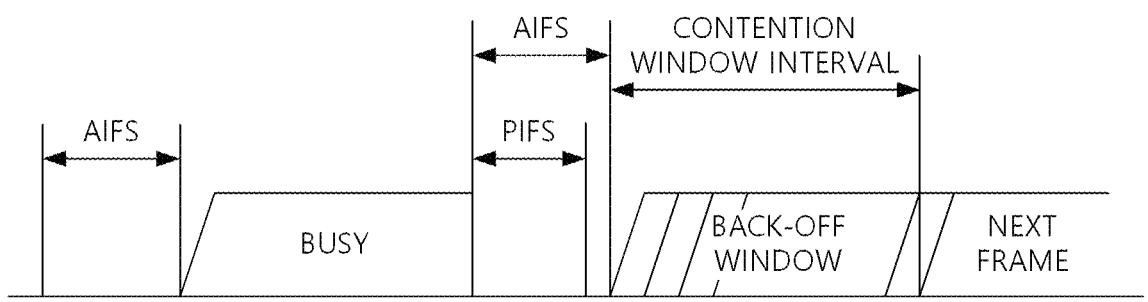
FIG. 15 illustrates a communication method (e.g., wireless LAN) operating in an existing unlicensed band.

FIG. 15 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 15, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT
The Tx entity does not perform the LBT procedure for transmission.

Category 2: LBT without Random Backoff
The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 μs length, but the present invention is not limited thereto.

Category 3: LBT Performing Random Backoff Using CW of Fixed Size
The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration $T_d$). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 μs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size
The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 16:
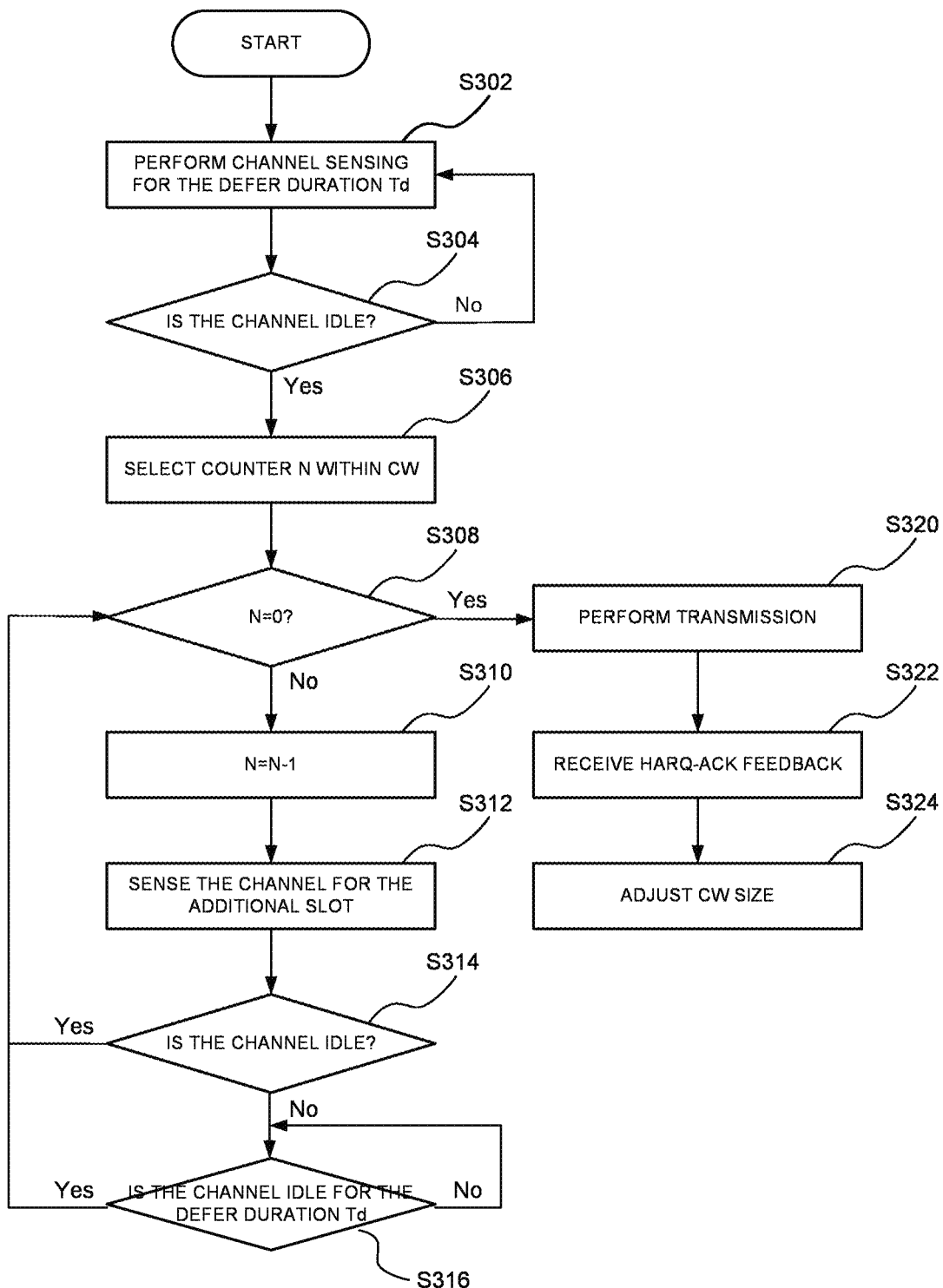
FIG. 16 illustrates a channel access procedure based on Category 4 LBT according to an embodiment of the present invention.

FIG. 16 illustrates a channel access procedure based on Category 4 LBT according to an embodiment of the present invention.

In order to perform the channel access, first, the Tx entity performs channel sensing for the defer duration $T_d$ (S302). According to an embodiment of the present invention, the channel sensing for a defer duration $T_d$ in step S302 may be performed through channel sensing for at least a portion of the defer duration $T_d$. For example, the channel sensing for the defer duration $T_d$ may be performed through the channel sensing during one slot period within the defer duration $T_d$. The Tx entity checks whether the channel is idle through the channel sensing for the defer duration $T_d$ (S304). If the channel is sensed to be idle for the defer duration $T_d$, the Tx entity proceeds to step S306. If the channel is not sensed to be idle for the defer duration $T_d$ (that is, sensed to be busy), the Tx entity returns to step S302. The Tx entity repeats steps S302 to S304 until the channel is sensed to be idle for the defer duration $T_d$. The defer duration $T_d$ may be set based on the channel access priority class of the Tx entity, and consists of a period of 16 μs and m consecutive slot periods. Here, m is a value set according to the channel access priority class.

Next, the Tx entity obtains a random value within a predetermined CW, sets the random value to the initial value of the backoff counter (or backoff timer) N (S306), and proceeds to step S308. The initial value of the backoff counter N is randomly selected from values between 0 and CW. The Tx entity performs the backoff procedure by using the set backoff counter N. That is, the Tx entity performs the backoff procedure by repeating S308 to S316 until the value of the backoff counter N reaches 0. Meanwhile, FIG. 16 illustrates that step S306 is performed after the channel is sensed to be idle for the defer duration $T_d$, but the present invention is not limited thereto. That is, step S306 may be performed independently of steps S302 to S304, and may be performed prior to steps S302 to S304. When step S306 is performed prior to steps S302 to S304, if the channel is sensed to be idle for the defer duration $T_d$ by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (S312). The Tx entity checks whether the channel is idle through the channel sensing for the additional slot period (S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 μs, but the present invention is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration $T_d$. According to an embodiment of the present invention, the channel sensing in step S316 may be performed in units of slots. That is, the Tx entity checks whether the channel is sensed to be idle during all slot periods of the additional defer duration $T_d$. When the busy slot is detected within the additional defer duration $T_d$, the Tx entity immediately restarts step S316. When the channel is sensed to be idle during all slot periods of the additional defer duration $T_d$, the Tx entity returns to step S308.

On the other hand, if the value of the backoff counter N is 0 in the check of step S308, the Tx entity performs the transmission (S320). The Tx entity receives a HARQ-ACK feedback corresponding to the transmission (S322). The Tx entity may check whether the previous transmission is successful through the received HARQ-ACK feedback. Next, the Tx entity adjusts the CW size for the next transmission based on the received HARQ-ACK feedback (S324).

As described above, after the channel is sensed to be idle for the defer duration $T_d$, the Tx entity may perform the transmission when the channel is idle for N additional slot periods. As described above, the Tx entity may be a base station or a UE, and the channel access procedure of FIG. 16 may be used for downlink transmission of the base station and/or uplink transmission of the UE.

Hereinafter, a method for adaptively adjusting a CWS when accessing a channel in an unlicensed band is presented. The CWS may be adjusted based on UE (User Equipment) feedback, and UE feedback used for CWS adjustment may include the HARQ-ACK feedback and CQI/PMI/RI. In the present invention, a method for adaptively adjusting a CWS based on the HARQ-ACK feedback is presented. The HARQ-ACK feedback includes at least one of ACK, NACK, DTX, and NACK/DTX.

As described above, the CWS is adjusted based on ACK even in a wireless LAN system. When the ACK feedback is received, the CWS is reset to the minimum value (CWmin), and when the ACK feedback is not received, the CWS is increased. However, in a cellular system, a CWS adjustment method in consideration of multiple access is required.

First, for the description of the present invention, terms are defined as follows.

Set of HARQ-ACK feedback values (i.e., HARQ-ACK feedback set): refers to HARQ-ACK feedback value(s) used for CWS update/adjustment. The HARQ-ACK feedback set is decoded at a time when the CWS is determined and corresponds to available HARQ-ACK feedback values. The HARQ-ACK feedback set includes HARQ-ACK feedback value(s) for one or more DL (channel) transmissions (e.g., PDSCH) on an unlicensed band carrier (e.g., Scell, NR-U cell). The HARQ-ACK feedback set may include HARQ-ACK feedback value(s) for a DL (channel) transmission (e.g., PDSCH), for example, a plurality of HARQ-ACK feedback values fed back from a plurality of UEs. The HARQ-ACK feedback value may indicate reception response information for the code block group (CBG) or the transport block (TB), and may indicate any one of ACK, NACK, DTX, or NACK/DTX. Depending on the context, the HARQ-ACK feedback value may be mixed with terms such as a HARQ-ACK value, a HARQ-ACK information bit, and a HARQ-ACK response.

Reference window: refers to a time interval in which a DL transmission (e.g., PDSCH) corresponding to the HARQ-ACK feedback set is performed in an unlicensed band carrier (e.g., Scell, NR-U cell). A reference window may be defined in units of slots or subframes according to embodiments. The reference window may indicate one or more specific slots (or subframes). According to an embodiment of the present invention, the specific slot (or reference slot) may include a start slot of the most recent DL transmission burst in which at least some HARQ-ACK feedback is expected to be available.

Figure 17:
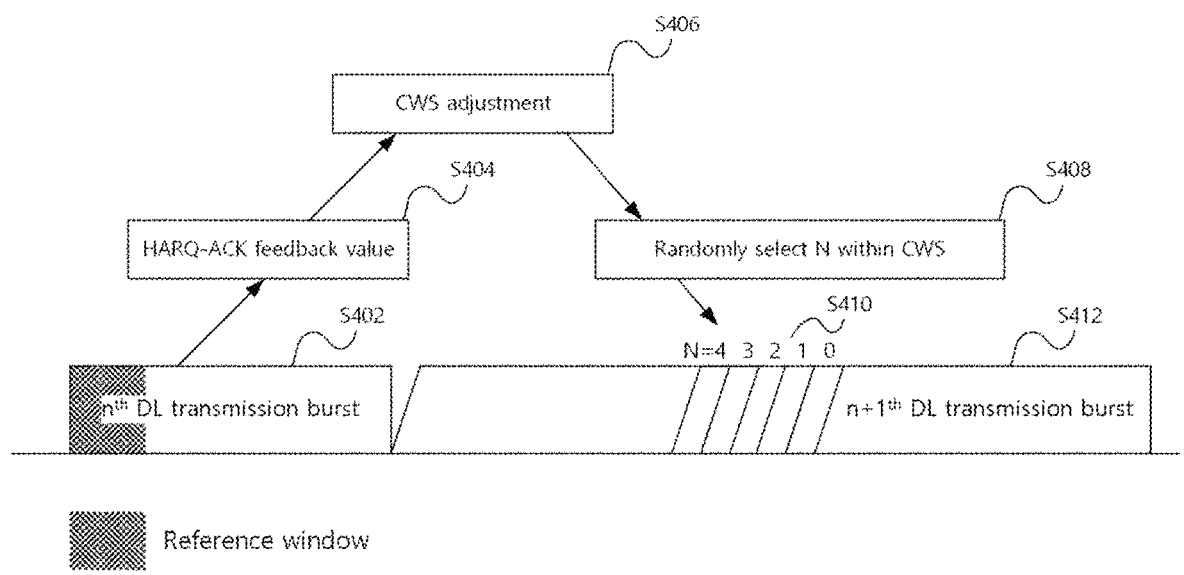
FIG. 17 illustrates an embodiment of a method of adjusting a contention window size (CWS) based on HARQ-ACK feedback.

FIG. 17 illustrates an embodiment of a method of adjusting a contention window size (CWS) based on HARQ-ACK feedback. In the embodiment of FIG. 17, the Tx entity may be a base station and the Rx entity may be a UE, but the present invention is not limited thereto. In addition, although the embodiment of FIG. 17 assumes a channel access procedure for the DL transmission by the base station, at least some configurations may be applied to a channel access procedure for the UL transmission by the UE.

Referring to FIG. 17, the Tx entity transmits the n-th DL transmission burst on an unlicensed band carrier (e.g., Scell, NR-U cell) (S402), and then if an additional DL transmission is required, the Tx entity may transmit the (n+1)-th DL transmission burst based on the LBT channel access (S412). Here, the transmission burst indicates a transmission through one or more adjacent slots (or subframes). FIG. 17 illustrates a channel access procedure and a CWS adjustment method based on the aforementioned first type channel access (that is, Category 4 channel access).

First, the Tx entity receives a HARQ-ACK feedback corresponding to the PDSCH transmission(s) on an unlicensed band carrier (e.g., Scell, NR-U cell) (S404). The HARQ-ACK feedback used for CWS adjustment includes a HARQ-ACK feedback corresponding to the most recent DL transmission burst (that is, n-th DL transmission burst) on the unlicensed band carrier. More specifically, the HARQ-ACK feedback used for CWS adjustment includes a HARQ-ACK feedback corresponding to the PDSCH transmission on the reference window within the most recent DL transmission burst. The reference window may indicate one or more specific slots (or subframes). According to an embodiment of the present invention, the specific slot (or reference slot) includes a start slot of the most recent DL transmission burst in which at least some HARQ-ACK feedback is expected to be available.

When the HARQ-ACK feedback is received, a HARQ-ACK value is obtained for each transport block (TB). The HARQ-ACK feedback includes at least one of a TB-based HARQ-ACK bit sequence and a CBG-based HARQ-ACK. When the HARQ-ACK feedback is the TB-based HARQ-ACK bit sequence, one HARQ-ACK information bit is obtained per TB. On the other hand, when the HARQ-ACK feedback is the CBG-based HARQ-ACK bit sequence, N HARQ-ACK information bit(s) are obtained per TB. Here, N is the maximum number of CBGs per TB configured in the Rx entity of the PDSCH transmission. According to an embodiment of the present invention, HARQ-ACK value(s) for each TB may be determined with the HARQ-ACK information bit(s) for each TB of the HARQ-ACK feedback for CWS determination. More specifically, when the HARQ-ACK feedback is the TB-based HARQ-ACK bit sequence, one HARQ-ACK information bit of the TB is determined as the HARQ-ACK value. However, when the HARQ-ACK feedback is the CBG-based HARQ-ACK bit sequence, one HARQ-ACK value may be determined based on N HARQ-ACK information bit(s) corresponding to CBGs included in the TB.

Next, the Tx entity adjusts the CWS based on the HARQ-ACK values determined in step S404 (S406). That is, the Tx entity determines the CWS based on the HARQ-ACK value(s) determined with the HARQ-ACK information bit(s) for each TB of the HARQ-ACK feedback. More specifically, the CWS may be adjusted based on the ratio of NACKs among HARQ-ACK value(s). First, variables may be defined as follows.

p: Priority class value
CW_min_p: Predetermined CWS minimum value of priority class p
CW_max_p: Predetermined CWS maximum value of priority class p
CW_p: CWS for transmission of priority class p. CW_p is set to any one of a plurality of CWS values between CW_min_p and CW_max_p included in the allowed CWS set of the priority class p.

According to an embodiment of the present invention, the CWS may be determined according to the following steps.

Step A-1) For every priority class p, CW_p is set to CW_min_p. In this case, the priority class p includes {1, 2, 3, 4}.

Step A-2) When the ratio of NACKs to HARQ-ACK values for the PDSCH transmission(s) of the reference window k is Z % or more, CW_p is increased to the next highest allowed value for every priority class p (further, Step A-2 remains). Otherwise, Step A proceeds to Step A-1. Here, Z is a predetermined integer in the range of 0<=Z<=100, and according to an embodiment, it may be set to one of {30, 50, 70, 80, 100}.

Here, the reference window k includes the start slot (or subframe) of the most recent transmission by the Tx entity. In addition, the reference window k is a slot (or subframe) in which at least some of the HARQ-ACK feedbacks is expected to be possible. If CW_p=CW_max_p, the next highest allowed value for CW_p adjustment is CW_max_p.

Next, the Tx entity selects a random value within the CWS determined in step S406 and sets the random value to the initial value of the backoff counter N (S408). The Tx entity performs backoff by using the set backoff counter N (S410). That is, the Tx entity may decrease the backoff counter by 1 for each slot period in which the channel is sensed to be idle. When the value of the backoff counter reaches 0, the Tx entity may transmit the (n+1)-th DL transmission burst in the channel (S412).

Meanwhile, in the above-described CWS adjustment process, determination has to be made as to whether not only ACK and NACK but also DTX or NACK/DTX are considered together among HARQ-ACK feedbacks. According to an embodiment of the present invention, depending on whether the transmission in the unlicensed band is based on self-carrier scheduling or cross-carrier scheduling, determination may be made as to whether DTX or NACK/DTX is considered together in the CWS adjustment process.

In self-carrier scheduling, a DL transmission (e.g., PDSCH) on the unlicensed band carrier is scheduled through the control channel (e.g., (E)PDCCH) transmitted on the same unlicensed band carrier. Here, since the DTX indicates a failure of the DL transmission by a hidden node or the like in the unlicensed band carrier, it may be used for CWS adjustment together with NACK. In addition, DTX is one of the methods in which the UE informs the base station that the UE fails to decode the control channel even though the base station transmits, to the UE, the control channel including scheduling information (e.g., (E)PDCCH). DTX may be determined only by the HARQ-ACK feedback value, or may be determined taking into account the HARQ-ACK feedback value and the actual scheduling situation. According to an embodiment of the present invention, DTX and NACK/DTX may be counted as NACK for CWS adjustment in the self-carrier scheduling situation. That is, when the ratio of the sum of NACK, DTX, and NACK/DTX to HARQ-ACK values for the PDSCH transmission(s) of the reference window k is equal to or greater than Z %, the CWS is increased to the next highest allowed value. Otherwise, the CWS is reset to the minimum value.

In cross-carrier scheduling, a DL transmission (e.g., PDSCH) on the unlicensed band carrier may be scheduled through the control channel (e.g., (E)PDCCH) transmitted on the licensed band carrier. In this case, since the DTX feedback is used to determine the decoding situation of the UE for the control channel transmitted on the licensed band carrier, it is not helpful to adaptively adjust the CWS for a channel access in the unlicensed band. Therefore, according to an embodiment of the present invention, DTX may be ignored for CWS determination in the cross-carrier scheduling situation from the licensed band. That is, for CWS adjustment, among HARQ-ACK value(s), only ACK and NACK may be considered for calculating the ratio of NACK, or only ACK, NACK and NACK/DTX may be considered for calculating the ratio of NACK. Therefore, when calculating the ratio of the NACK, DTX may be excluded.

Figure 18:
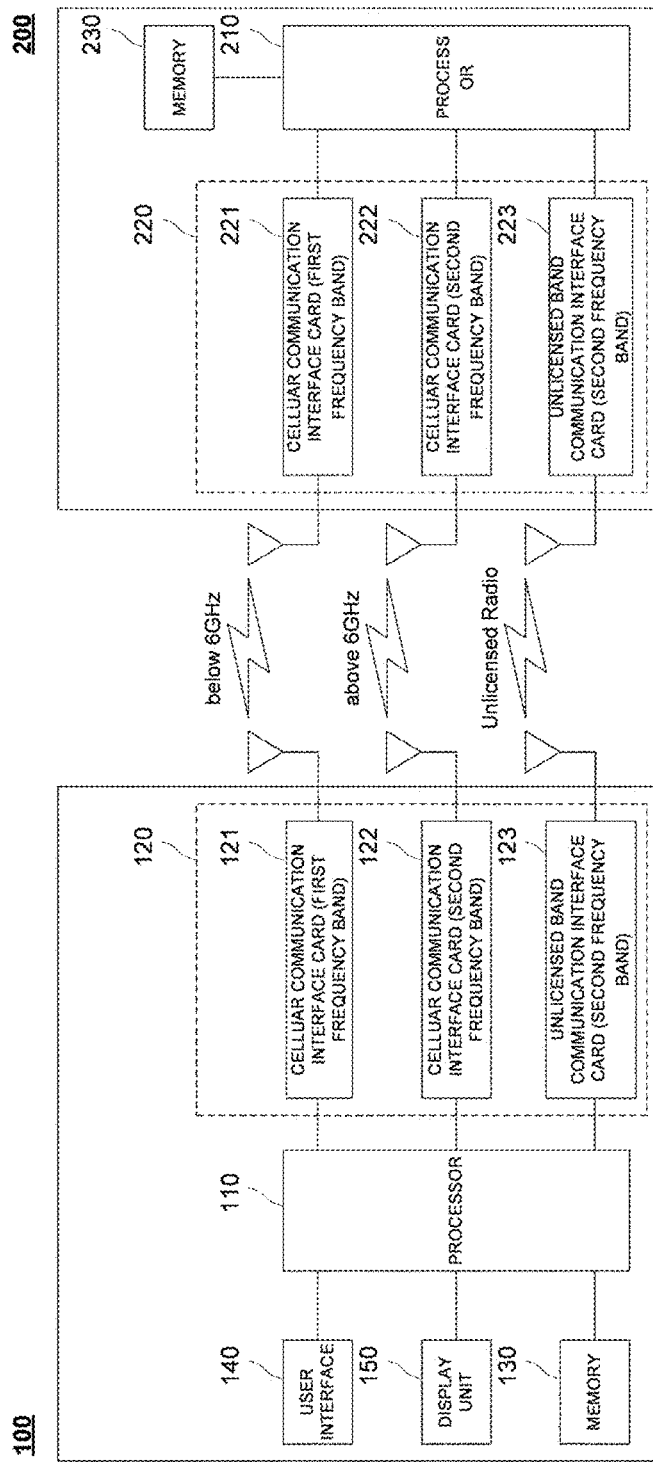
FIG. 18 is a block diagram illustrating configurations of a UE and a base station according to an embodiment of the present invention.

FIG. 18 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 100 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 18 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

A channel access procedure performed by a wireless communication device according to an embodiment of the present invention in an unlicensed band will be described with reference to FIG. 19. Specifically, an LBT procedure used when a wireless communication device according to an embodiment of the present invention performs a channel access in an unlicensed band will be described. In particular, a channel access in which the wireless communication device performs a transmission according to a result of channel sensing within a time interval of a predetermined duration may be configured in the wireless communication device. In this case, a method for operating a wireless communication device when the wireless communication device fails to access a channel will be described. The specified duration which has been mentioned earlier may be 16 µs.

For convenience of description, the wireless communication device, which is a wireless endpoint that initiates channel occupation, is referred to as an initiating node. In addition, a wireless communication device, which is a wireless endpoint communicating with the initiating node, is referred to as a responding node. The initiating node may be a base station and the responding node may be a UE. In addition, the initiating node may be a UE and the responding node may be a base station. When the initiating node intends to transmit data, the initiating node may perform a channel access according to a channel access priority class determined according to the type of data. In this case, a parameter used for a channel access may be determined according to the type of data. The parameters used for the channel access may include any one of the minimum value of the CW, the maximum value of the CW, the maximum occupancy time (MCOT), which is the maximum duration capable of occupying a channel in one channel occupancy, and the number ($m_p$) of sensing slots. Specifically, the initiating node may perform the above-described Category 4 LBT according to the channel access priority class determined according to the type of data.

Table 4 below shows an example of values of parameters used for a channel access according to the channel access priority class. Specifically, Table 4 shows values of parameters used for a channel access for each channel access priority class for the downlink transmission in the LTE LAA system.

When the downlink channel transmitted by the wireless communication device includes data traffic, the defer duration may be configured according to the channel access priority class of traffic included in the downlink channel. In addition, the defer duration may include an initial duration $T_f$ or one or more ($m_p$) slot durations $T_{sl}$. In this case, the slot duration $T_{sl}$ may be 9 µs. The initial duration includes one idle slot duration $T_{sl}$. In addition, the number ($m_p$) of slot durations included in the defer duration may be configured according to the above-described channel access priority class. Specifically, the number ($m_p$) of slot durations included in the defer duration may be configured as shown in Table 4.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 4-continued

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, the wireless communication device may configure the range of the CW values according to the channel access priority class. Specifically, the wireless communication device may set the value of the CW to satisfy $CW_{min,p}<=CW<=CW_{max,p}$. In this case, the minimum value $CW_{min,p}$ and the maximum value $CW_{max,p}$ of the CW may be determined according to the channel access priority class. Specifically, the minimum value $CW_{min,p}$ and the maximum value CWmax,p of the CW may be determined as shown in Table 4. The wireless communication device may set a minimum value $CW_{min,p}$ and a maximum value $CW_{max,p}$ of CW in a counter value setting procedure. When the wireless communication device accesses the channel, the wireless communication device may adjust the value of the CW as described above with reference to FIGS. 15 to 17. In addition, in the wireless communication device of the unlicensed band, the MCOT $T_{mcot,p}$ may be determined according to the channel access priority of data included in the transmission as described above. Specifically, the MCOT may be determined as shown in Table 4. Accordingly, the wireless communication device may not be allowed to perform continuous transmissions for a time exceeding the MCOT in the unlicensed band. This is because the unlicensed band is a frequency band used by various wireless communication devices according to certain rules. In Table 4, when the value of the channel access priority class is p=3 or p=4, the unlicensed band is used for a long term according to the regulations, and there is no wireless communication device using other technology, the wireless communication device may be configured with $T_{m,cot,p}=10$ ms. Otherwise, the wireless communication device may be configured with $T_{mcot,p}=8$ ms.

Table 5 shows values of parameters used for a channel access for each channel access priority class for uplink transmission used in the LTE LAA system.

TABLE 5

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technology sharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

As described in Table 5, the MCOT value 6 ms may be increased to 8 ms when one or more gaps are included in the transmission. The gap represents the time from when the transmission is stopped in a carrier until the transmission is resumed in the carrier. In this case, the minimum value of the duration of the gap is 100 μs. Furthermore, the maximum value of the duration of transmission performed before the gap is included is 6 ms. Furthermore, the duration of the gap is not included in the channel occupancy time. When the value of the channel access priority class is 3 or 4 and it is guaranteed that no other radio access technology is used in the carrier on which the channel access is performed, the value of MCOT may be 10 ms. In this case, another wireless access technology may include Wi-Fi. Otherwise, the value of the MCOT may be determined as described in Note 1 of Table 5.

The COT represents the time the wireless communication device occupies a channel. As described above, the MCOT represents a time during which the initiating node is able to continuously occupy a channel in any one carrier of a unlicensed band to the maximum. However, as described above, the gap, which is an interval in which the transmission is not performed, may be included between a plurality of transmissions, and when the gap is included, the value of the MCOT may be applied differently.

Figure 19:
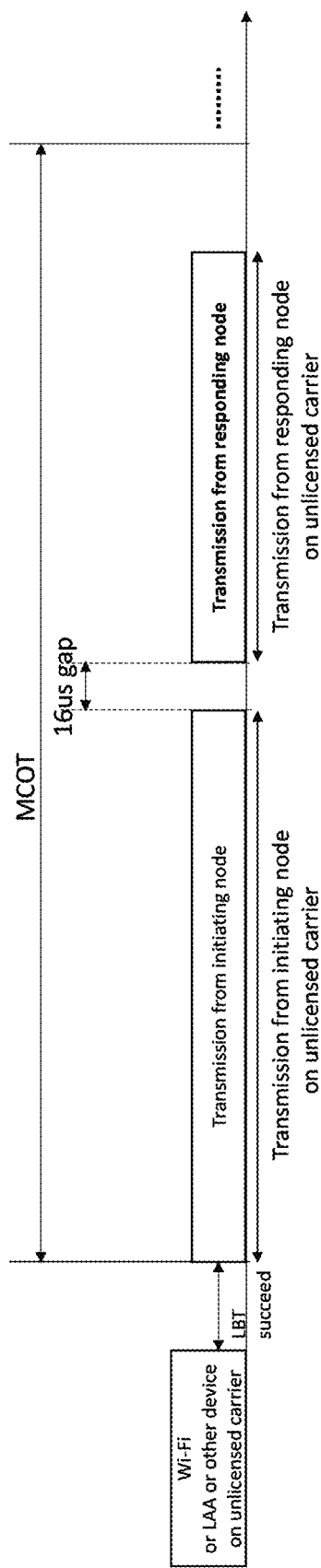
FIG. 19 illustrates that when a duration of transmission of an initiating node within a channel occupancy initiated by the initiating node does not exceed a maximum occupancy time (MCOT) of the channel occupancy, a responding node performs a transmission within a channel occupancy time (COT) initiated by the initiating node, according to an embodiment of the present invention.

FIG. 19 illustrates that when the duration of transmission of an initiating node within a channel occupancy initiated by the initiating node does not exceed an MCOT of the channel occupancy, a responding node performs a transmission within the channel occupancy initiated by the initiating node, according to an embodiment of the present invention. That is, FIG. 19 illustrates that after the initiating node completes a transmission in any one channel, the responding node performs the transmission in the channel. As described above, it may be described as sharing the channel occupancy that the initiating node and the responding node perform transmissions in one channel.

If the duration of transmission of the initiating node is less than the duration of the MCOT, the responding node may perform the transmission within the channel occupancy initiated by the initiating node. FIG. 19 shows such a case, where a gap between the transmission of the initiating node and the transmission of the responding node is 16 μs. In this case, a method for performing a channel access by the responding node may be problematic.

In an embodiment of the present invention, when the duration of the gap is not greater than the first duration, the responding node may perform a transmission immediately after the gap without sensing. Specifically, the responding node may perform the above-described Category 1 channel access. The first duration may be 16 μs, and this may be applied to embodiments to be described later. In the embodiment, additional constrains other than the MCOT may be applied to the duration of transmission of the responding node. In a specific embodiment, the responding node may perform the transmission within a predetermined duration. In this case, the predetermined duration may be a constraint applied to the transmission of the responding node separately from the MCOT. Specifically, the predetermined duration may be 584 μs.

In an embodiment of the present invention, when the duration of the gap is the same as the first duration, the responding node may perform the first fixed duration-based channel access for the transmission following the gap. The first fixed duration-based channel access is a channel access in which, when the channel is sensed to be idle within the first fixed duration, the wireless communication device performing the first fixed duration-based channel access is allowed to perform a transmission immediately after the first fixed duration. Specifically, in the first fixed duration-based channel access, the wireless communication device performs channel sensing within the first fixed duration and performs a transmission on the channel when the channel is sensed to be idle within the fixed duration. The first fixed duration-based channel access may be the above-described Category 2 LBT. In the embodiment, the initiating node may implicitly or explicitly indicate the first fixed duration-based channel access to the responding node. For example, the base station, which is the initiating node, may indicate the first fixed duration-based channel access to the responding node by using a grant.

In an embodiment of the present invention, when the gap between consecutively scheduled or granted transmissions within the channel occupancy initiated by the initiating node is not greater than the second fixed duration, the node performing the second transmission may perform the second fixed duration-based channel access. The second fixed duration-based channel access is a channel access in which, when the channel is idle while having the second fixed duration, the wireless communication device performing the second fixed duration-based channel access is allowed to perform a transmission immediately after the second fixed duration. Specifically, in the second fixed duration-based channel access, the wireless communication device performs channel sensing for the second fixed duration and performs a transmission on the channel when the channel is sensed to be idle for the fixed duration. The second fixed duration may be greater than the first fixed duration described above. Specifically, the second duration may be 25 µs, and this may be applied to embodiments to be described later. In addition, even when the uplink transmission is not followed by the downlink transmission within the same channel occupancy, the UE may perform the second fixed duration-based channel access for the uplink transmission after the uplink transmission. In addition, even when the downlink transmission is not followed by the uplink transmission within the same channel occupancy, the UE may perform the second fixed duration-based channel access for the uplink transmission. In addition, when the gap between the uplink transmission and the subsequent downlink transmission is greater than 16 µs and not greater than 25 µs within the same channel occupancy, the base station may perform the second fixed duration-based channel access for the downlink transmission.

Embodiments applied when the gap is not greater than the first fixed duration will be described. In this case, the first fixed duration may be 16 µs as described above.

When the gap is not greater than the first fixed duration, the responding node performing the transmission following the gap may immediately perform a transmission without sensing or may perform the transmission by performing the first fixed duration-based channel access. In this case, the responding node may immediately perform the transmission without sensing or may perform the transmission by performing the first fixed duration-based channel access, depending on whether the transmission following the gap includes data traffic that may be classified as traffic or data traffic that determines the channel access priority class. Specifically, when the responding node transmits a HARQ-ACK feedback for data traffic transmitted from the initiating node, the responding node may immediately perform the transmission without sensing.

In another specific embodiment, when the responding node transmits uplink control information (UCI) for data traffic transmitted from the initiating node, the responding node may immediately perform the transmission without sensing.

In another specific embodiment, when the responding node transmits the SRS, the responding node may immediately perform the transmission without sensing.

In another specific embodiment, when the responding node transmits a physical random access channel (PRACH), the responding node may immediately perform the transmission without sensing.

In the above-described embodiments, when the responding node performs the transmission including data traffic immediately after the gap, the responding node may perform the first fixed duration-based channel access. Specifically, when data traffic is scheduled or configured by the initiating node, the responding node may perform the first fixed duration-based channel access. When it is possible to classify the data traffic as traffic or determine the channel access priority class of the data traffic, the responding node may perform the first fixed duration-based channel access.

In the above-described embodiments, the responding node's immediately performing the transmission without sensing may represent that the initiating node performs the above-described Category 4 channel access. As described above, the first fixed duration-based channel access may be the Category 2 LBT.

In the COT initiated by the initiating node, the initiating node may perform the transmission following the transmission of the responding node. In this case, in the COT initiated by the initiating node, the gap between the transmission of the initiating node and the subsequent transmission of the responding node may not be greater than the first fixed duration. The initiating node may immediately perform the transmission without sensing or may perform the transmission by performing the first fixed duration-based channel access, depending on whether the transmission after the gap includes data traffic that may be classified as traffic or data traffic that determines the channel access priority class.

Specifically, when the initiating node transmits only control information for scheduling data transmitted by the responding node, the initiating node may immediately perform the transmission without sensing. In this case, the control information may be at least one of PDCCH only, group common signaling, paging, a reference signal only, a tracking reference signal (TRS), a RACH message 4, or a handover command.

In yet another specific embodiment, when the initiating node transmits only broadcasting information, the initiating node may immediately perform the transmission without sensing. In this case, the broadcasting information may be at least one of a discovery reference signal (DRS), an SS/PBCH block, a Type0-PDCCH, or remaining system information (RMSI).

In the above-described embodiments, when the initiating node performs the transmission including data traffic immediately after the gap, the initiating node may perform the first fixed duration-based channel access. Specifically, when the data traffic schedules the responding node or is configured for the responding node, the initiating node may perform the first fixed duration-based channel access. When the data traffic is classified as traffic or the data traffic determines the channel access priority class, the initiating node may perform the first fixed duration-based channel access.

In the above-described embodiments, the initiating node's immediately performing the transmission without sensing may represent that the initiating node performs the aforementioned Category 4 channel access. As described above, the first fixed duration-based channel access may be the Category 2 LBT.

In the above-described embodiments, the initiating node may be a base station and the responding node may be a UE. That is, in the above-described embodiments, the channel occupancy may be initiated by a base station. In addition, the initiating node may be a UE and the responding node may be a base station. That is, in the above-described embodiments, the channel occupancy may be initiated by a UE.

In the above-described embodiments, a node performing the transmission after the gap may perform the transmission within the MCOT.

Figure 20:
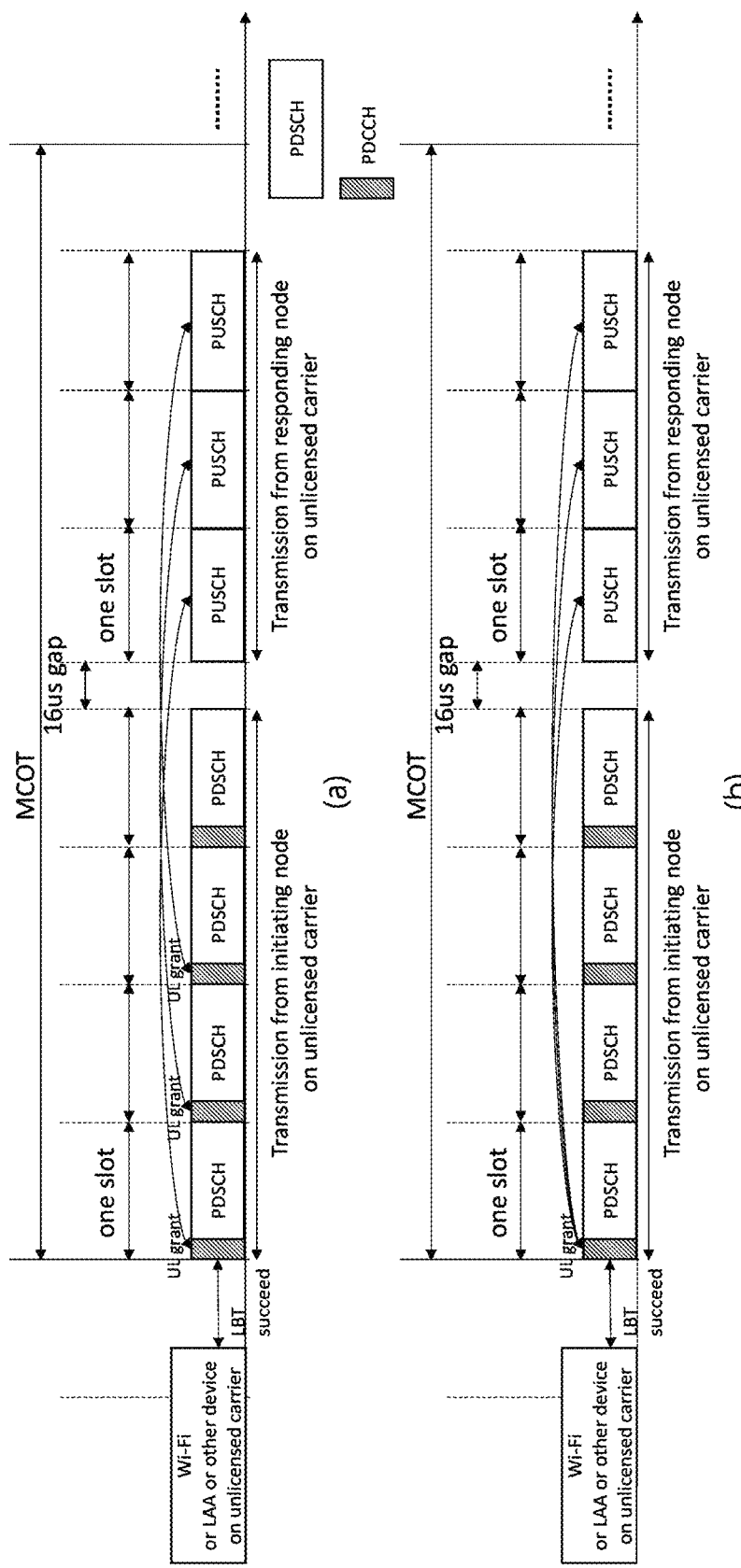
FIG. 20 illustrates an operation of a UE when a downlink transmission does not occupy as much as an MCOT within a channel occupancy initiated by a base station and transmission of the UE is scheduled or configured by the base station, according to an embodiment of the present invention.

FIG. 20 illustrates an operation of a UE when a downlink transmission does not occupy as much as a MCOT within a COT initiated by a base station and transmission of the UE is scheduled or configured by the base station, according to an embodiment of the present invention.

In FIG. 20, a gap between the downlink transmission of the base station and the uplink transmission of the UE is 16 μs. In the case of FIG. 20(a), the downlink transmission includes a plurality of UL grants for scheduling a PUSCH transmission in units of slots. The UE transmits PUSCHs in a plurality of slots based on a plurality of UL grants. In the case of FIG. 20(b), the downlink transmission includes one UL grant for scheduling the PUSCH transmission in a plurality of slots. The UE transmits the PUSCH in a plurality of slots based on the UL grant. In FIG. 20, scheduling for uplink transmission is performed within the channel occupancy acquired by the base station, which is an initiating node, but configuration or scheduling of uplink transmission may be performed before the channel occupancy. Even in this case, embodiments to be described later may be applied.

The initiating node may be a base station and the responding node may be a UE. When the gap between the transmission of the initiating node and the transmission of the responding node is the first fixed duration, the base station may implicitly or explicitly indicate the first fixed duration-based channel access. For example, the base station, which is the initiating node, may indicate the first fixed duration-based channel access to the responding node by using the UL grant. In this case, the UE senses the channel within the first fixed duration. When the channel is sensed to be idle during the first duration, the UE immediately performs the transmission after the first fixed duration. When the channel is sensed to be busy during the first duration, a method for operating the UE is problematic. Specifically, as described above, the uplink transmission of the UE on a plurality of slots may be scheduled or configured. In this case, even if the UE fails to access the channel in the first slot among the plurality of slots, a channel access for the uplink transmission may be required in a slot other than the first slot among the plurality of slots. In this case, the method for operating the UE will be described. For convenience of description, a plurality of slots in which uplink transmission of the UE is scheduled or configured denoted by {slot(n), slot(n+1), slot(n+2), . . . , slot(n+k−1)}, and the number of a plurality of slots is denoted by k.

For the UE, a plurality of uplink transmissions may be scheduled or configured. A plurality of uplink transmissions may be continuous without a gap. Specifically, the UE may receive a grant for scheduling a plurality of uplink transmissions from the base station. The grant refers to downlink control information (DCI), and may include a DL grant or a UL grant for scheduling uplink transmissions. In the specific embodiment, the DL grant or the UL grant may indicate a fixed duration-based channel access as a channel access type, and may indicate a channel access priority used to access a channel in which the plurality of uplink transmissions are performed. In this case, the DL grant or the UL grant may indicate the first fixed duration-based channel access as the channel access type.

The UE may attempt the first fixed duration-based channel access for the first transmission which is one of the plurality of uplink transmissions, and the UE may attempt the first fixed duration-based channel access for a second transmission which is a transmission following the first transmission when the first fixed duration-based channel access fails. When the UE succeeds in the first fixed duration-based channel access, the UE may perform the second transmission. In a specific embodiment, the UE may perform the first fixed duration-based channel access for uplink transmission for each of the remaining slots slot(n+1), slot(n+2), . . . , slot(n+k−1) after the first slot slot(n) of a plurality of slots.

In another specific embodiment, the UE may perform the first fixed duration-based channel access for uplink transmission a predetermined number of times in the remaining slots slot(n+1), slot(n+2), . . . , slot(n+k−1) after the first slot slot(n) of the plurality of slots. In this case, the predetermined number of times may be limited to k−1.

In yet another specific embodiment, the UE may attempt the first fixed duration-based channel access for the first transmission which is one of the plurality of uplink transmissions, and the UE may attempt the first fixed duration-based channel access or a random backoff-based access depending on whether the channel is continuously sensed to be idle for a second transmission which is a transmission following the first transmission when the first fixed duration-based channel access fails. When the UE fails in the first fixed duration-based channel access in the first slot slot(n) and the channel is continuously sensed to be idle after the failure of the channel access by the UE, the UE may attempt the first fixed duration-based channel access for the second transmission. In this case, when the UE succeeds in the first fixed duration-based channel access, the UE may perform the second transmission. In addition, when the UE fails in the first fixed duration-based channel access in the first slot slot(n) and the channel is not continuously sensed to be idle after the failure of the channel access by the UE, the UE may perform a random backoff-based channel access for the uplink transmission, in the remaining slots slot(n+1), slot (n+2), . . . , slot(n+k−1) after the first slot slot(n) of the plurality of slots. When the UE succeeds in the random backoff-based channel access, the UE may perform the second transmission. In this case, when the random backoff-based channel access as a channel access method is indicated to the UE through DCI in the first slot slot(n) or remaining slots slot(n+1), slot(n+2), . . . , slot(n+k−1) after the first slot slot(n), of the plurality of slots, the UE may perform the random backoff-based channel access by using the channel access priority class indicated by the DCI. When other channel access methods, other than the random backoff-based channel access, as a channel access method are indicated to the UE through DCI in all of the plurality of slots slot(n), slot(n+1), slot(n+2), . . . , slot(n+k−1), the UE may perform the random backoff-based channel access for uplink transmission by using the channel access priority class indicated through the scheduling DCI. To this end, when the base station indicates the fixed duration-based channel access in the DCI, the base station may indicate the channel access priority class used to obtain access to the channel in the DCI. Specifically, when the base station indicates the first fixed duration-based channel access in the DCI, the base station may indicate the channel access priority class used to obtain access to the channel in the DCI.

In yet another specific embodiment, the UE may attempt the first fixed duration-based channel access for the first transmission which is one of the plurality of uplink transmissions, and the UE may attempt the second fixed duration-based channel access for the second transmission which is a transmission following the first transmission when the first fixed duration-based channel access fails. When the UE succeeds in the second fixed duration-based channel access, the UE may perform the second transmission. Specifically, after the UE fails in the first fixed duration-based channel access in the first slot slot(n), the UE may sense whether or not the UE is idle every sensing slot $T_{sl}$. When the UE fails in the first fixed duration-based channel access in the first slot slot(n) and the channel is continuously sensed to be idle after the failure of the channel access by the UE, the UE may perform the second fixed duration-based channel access for uplink transmission, in the remaining slots slot(n+1), slot(n+2), . . . , slot(n+k−1) after the first slot slot(n) of the plurality of slots. This is performed by taking it into account that the first fixed duration-based channel access may be performed when the gap is the first fixed duration period, and the channel access fails in the first slot slot(n) and thus the gap between transmissions is increased. When the UE fails in the first fixed duration-based channel access in the first slot slot(n) and the channel is not continuously sensed to be idle after the failure of the channel access by the UE, the UE may perform the random backoff-based channel access for uplink transmission, in the remaining slots slot(n+1), slot(n+2), . . . , slot(n+k−1) after the first slot slot(n) of the plurality of slots. When the UE succeeds in the random backoff-based channel access, the UE may perform the second transmission. In this case, when the random backoff-based channel access as a channel access method is indicated to the UE through DCI in the first slot slot(n) or remaining slots slot(n+1), slot(n+2), . . . , slot(n+k−1) after the first slot slot(n), of the plurality of slots, the UE may perform the random backoff-based channel access by using the channel access priority class indicated by the DCI. When other channel access methods, other than the random backoff-based channel access, as a channel access method are indicated to the UE through DCI in all of the plurality of slots slot(n), slot(n+1), slot(n+2), . . . , slot(n+k−1), the UE may perform the random backoff-based channel access for uplink transmission by using the channel access priority class indicated through the scheduling DCI. To this end, when the base station indicates the fixed duration-based channel access in the DCI, the base station may indicate the channel access priority class used to obtain access to the channel in the DCI. Specifically, when the base station indicates the first fixed duration-based channel access in the DCI, the base station may indicate the channel access priority class used to obtain access to the channel in the DCI.

In yet another specific embodiment, a gap of the first fixed duration may be configured between the transmission from the base station and the uplink transmission that the UE intends to transmit, and thus the UE may switch the channel access type to the first fixed duration-based channel access for the first transmission which is one of the plurality of uplink transmissions. In this case, when the first fixed duration-based channel access fails, the UE may attempt a channel access according to the channel access type indicated through DCI for the second transmission, which is a transmission following the first transmission. When the UE succeeds in the channel access, the UE may perform the second transmission. Specifically, when the UE fails in the first fixed duration-based channel access in the first slot slot(n), the UE may perform the channel access for uplink transmission according to the channel access type indicated through the DCI, in the remaining slots slot(n+1), slot(n+2), . . . , slot(n+k−1) after the first slot slot(n) of the plurality of slots. In addition, when a plurality of grants schedule uplink transmissions on a plurality of slots, the channel access type for uplink transmission may be indicated for each slot. The UE may perform the channel access for uplink transmission according to the channel access type indicated for each of the remaining slots slot(n+1), slot(n+2), . . . , slot(n+k−1) after the first slot slot(n) of the plurality of slots. In the embodiment, when the channel access type indicated through DCI is the first fixed duration-based channel access, the operation of the UE may be the same as the first and second embodiments described. However, when the channel access type indicated through DCI is not the first fixed duration-based channel access, the operation of the UE differs from the first and second embodiments described.

In yet another specific embodiment, when the UE fails in the first fixed duration-based channel access in the first slot slot(n), the UE may perform the random backoff-based channel access for uplink transmission in the remaining slots slot(n+1), slot(n+2), . . . , slot(n+k−1) after the first slot slot(n) of the plurality of slots. This takes into account the possibility that the channel is not idle and that the channel is being busy due to other nodes using unlicensed band. Specifically, in the embodiment, when the channel is sensed to be busy rather than idle through the first fixed duration-based channel access, even if the first fixed duration-based channel access or the second fixed duration-based channel access is continuously performed, the channel is being busy due to other nodes, and thus it is highly likely that the channel is not idle and is busy. Therefore, this is a method in which the UE performs uplink transmission after performing the random backoff-based channel access for transmission for the slot(n+1) and subsequent slot.

In the above-described embodiments, the random backoff-based channel access may be Category 4 LBT.

Regarding the case where uplink transmissions are scheduled, previous embodiments of the present invention have been described with a focus on the case where uplink transmissions are scheduled by the scheduling grant. The above-described embodiments may be applied even when resources in units of time and frequency are configured by the RRC configuration, and the UE performs uplink transmission in the configured resource.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A user equipment (UE) for use in a $3^{rd}$ generation partnership project new radio (3GPP NR)-based wireless communication system supporting operations in an unlicensed band, the UE comprising:
    a communication module; and
    a processor controlling the communication module, wherein the processor is configured to:
    receive scheduling information for a plurality of consecutive UL transmissions;
    attempt a channel access to transmit an UL transmission, which is not a last UL transmission, among the plurality of consecutive UL transmissions, according to one of at least:
        a first channel access type based on a back-off, and
        a second channel access type based on a fixed sensing duration only, the fixed sensing duration being one of various time lengths including 16 μs and 25 μs; and
        based on (1) the first channel access corresponding to the second channel access type with a fixed sensing duration of 16 μs, and (2) the channel access being failed, attempt to transmit a next UL transmission among the plurality of consecutive UL transmissions, according to the second channel access type with a fixed sensing duration of 25 μs.

2. The UE of claim 1, wherein, based on (1) and (2) being satisfied, the transmission of the next UL transmission is attempted according to the second channel access type with the fixed sensing duration of 25 μs, regardless of any channel access type indicated for the plurality of consecutive UL transmissions.

3. The UE of claim 1, wherein the scheduling information is received via at least one physical downlink control channel (PDCCH), and the plurality of consecutive UL transmissions includes a plurality of consecutive physical uplink shared channel (PUSCH) transmissions.

4. The UE of claim 1, wherein the plurality of consecutive UL transmissions is within a channel occupancy time (COT) initiated based on a downlink (DL) transmission.

5. The UE of claim 1, wherein the scheduling information indicates a channel access priority associated with the UL transmission.

6. The UE of claim 1, wherein the scheduling information is received via a single UL grant, and the single UL grant is used for scheduling all the plurality of consecutive UL transmissions, or wherein the scheduling information is received via a plurality of UL grants, and each of the plurality of UL grants is used for scheduling a respective one of the plurality of consecutive UL transmissions.

7. A method for a user equipment (UE) to use in a $3^{rd}$ generation partnership project new radio (3GPP NR)-based wireless communication system supporting operations in an unlicensed band, the method comprising:
    receiving scheduling information for a plurality of consecutive UL transmissions;
    attempting a channel access to transmit an UL transmission, which is not a last UL transmission, among the plurality of consecutive UL transmissions, according to one of at least:
        a first channel access type based on a back-off, and
        a second channel access type based on a fixed sensing duration only, the fixed sensing duration being one of various time lengths including 16 μs and 25 μs; and
    based on (1) the channel access corresponding to the second channel access type with a fixed sensing duration of 16 μs, and (2) the channel access being failed, attempting to transmit a next UL transmission among the plurality of consecutive UL transmissions, according to the second channel access type with a fixed sensing duration of 25 μs.

8. The method of claim 7, wherein, based on (1) and (2) being satisfied, the transmission of the next UL transmission is attempted according to the second channel access type with the fixed sensing duration of 25 μs, regardless of any channel access type indicated for the plurality of consecutive UL transmissions.

9. The method of claim 7, wherein the scheduling information is received via at least one physical downlink control channel (PDCCH), and the plurality of consecutive UL transmissions includes a plurality of consecutive physical uplink shared channel (PUSCH) transmissions.

10. The method of claim 7, wherein the plurality of consecutive UL transmissions is within a channel occupancy time (COT) initiated based on a downlink (DL) transmission.

11. The method of claim 7, wherein the scheduling information indicates a channel access priority associated with the UL transmission.

12. The method of claim 7, wherein the scheduling information is received via a single UL grant, and the single UL grant is used for scheduling all the plurality of consecutive UL transmissions, or wherein the scheduling information is received via a plurality of UL grants, and each of the plurality of UL grants is used for scheduling a respective one of the plurality of consecutive UL transmissions.

* * * * *